United States Patent
Dallal et al.

(10) Patent No.: US 11,582,079 B2
(45) Date of Patent: Feb. 14, 2023

(54) FAST FEEDBACK TECHNIQUES FOR HIGH FREQUENCY BANDS IN WIRELESS COMMUNICATIONS SYSTEMS

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/191,585

(22) Filed: Mar. 3, 2021

(65) Prior Publication Data
US 2022/0286340 A1 Sep. 8, 2022

(51) Int. Cl.
*H04L 27/26* (2006.01)
*H04W 76/19* (2018.01)

(52) U.S. Cl.
CPC .... *H04L 27/26025* (2021.01); *H04L 27/2607* (2013.01); *H04L 27/2634* (2013.01); *H04W 76/19* (2018.02)

(58) Field of Classification Search
None
See application file for complete search history.

(56) References Cited

U.S. PATENT DOCUMENTS

| 2011/0032850 A1* | 2/2011 | Cai | H04L 5/0023 370/344 |
| 2016/0294498 A1* | 10/2016 | Ma | H04L 25/03834 |
| 2018/0139773 A1* | 5/2018 | Ma | H04L 5/0053 |
| 2018/0220444 A1* | 8/2018 | Lee | H04W 72/1263 |
| 2018/0324768 A1* | 11/2018 | Shaheen | H04W 72/0446 |
| 2021/0099254 A1* | 4/2021 | Babaei | H04L 1/1887 |

* cited by examiner

*Primary Examiner* — Diane L Lo
(74) *Attorney, Agent, or Firm* — Holland & Hart LLP/Qualcomm Incorporated

(57) ABSTRACT

Methods, systems, and devices for wireless communications are described. Generally, the described techniques provide for a base station to transmit a feedback configuration to a user equipment (UE) indicating a subcarrier spacing and a length of a cyclic prefix (CP) that the UE is to use to transmit feedback associated with a second frequency band (e.g., a high frequency band) using a first frequency band (e.g., a low frequency band). The UE may monitor the second frequency band for downlink messages transmitted by the base station and transmit a feedback message accordingly using the indicated subcarrier spacing and applying a CP having the indicated length.

28 Claims, 16 Drawing Sheets

FAST FEEDBACK TECHNIQUES FOR HIGH FREQUENCY BANDS IN WIRELESS COMMUNICATIONS SYSTEMS

FIELD OF TECHNOLOGY

The following relates to wireless communications, including fast feedback techniques for high frequency bands in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support devices using high frequency bands, including bands in a sub-Terahertz (sub-THz) frequency range. In some cases, devices may also use low frequency bands in addition to high frequency bands to perform communications. Such operations, however, may be inefficient, which may lead to increased latency and poor user experience.

SUMMARY

The described techniques relate to improved methods, systems, devices, and apparatuses that support fast feedback techniques for high frequency bands in wireless communications systems. Generally, the described techniques provide for a base station to transmit a feedback configuration to a user equipment (UE). The feedback configuration may indicate a subcarrier spacing and a length of a cyclic prefix (CP) that the UE is to use to transmit feedback associated with a second frequency band (e.g., a high frequency band) using a first frequency band (e.g., a low frequency band). The UE may monitor the second frequency band for downlink messages transmitted by the base station and transmit a feedback message using the indicated subcarrier spacing and applying a CP having the indicated length.

A method for wireless communications at a UE is described. The method may include receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, monitoring the second frequency band for a downlink message from the base station, and transmitting, to the base station, the feedback message for the downlink message over the first frequency band using the subcarrier spacing based on the feedback configuration and on the monitoring the second frequency band, the feedback message including a CP having the indicated length.

An apparatus for wireless communications at a UE is described. The apparatus may include a processor, memory coupled with the processor, and instructions stored in the memory. The instructions may be executable by the processor to cause the apparatus to receive, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, monitor the second frequency band for a downlink message from the base station, and transmit, to the base station, the feedback message for the downlink message over the first frequency band using the subcarrier spacing based on the feedback configuration and on the monitoring the second frequency band, the feedback message including a CP having the indicated length.

Another apparatus for wireless communications at a UE is described. The apparatus may include means for receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, means for monitoring the second frequency band for a downlink message from the base station, and means for transmitting, to the base station, the feedback message for the downlink message over the first frequency band using the subcarrier spacing based on the feedback configuration and on the monitoring the second frequency band, the feedback message including a CP having the indicated length.

A non-transitory computer-readable medium storing code for wireless communications at a UE is described. The code may include instructions executable by a processor to receive, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, monitor the second frequency band for a downlink message from the base station, and transmit, to the base station, the feedback message for the downlink message over the first frequency band using the subcarrier spacing based on the feedback configuration and on the monitoring the second frequency band, the feedback message including a CP having the indicated length.

In some examples of the method, apparatuses, and non-transitory computer-readable medium described herein, transmitting the feedback message may include operations, features, means, or instructions for applying, to the feedback message, the CP having the indicated length corresponding to a long CP, where the feedback message includes a number of resource elements that may be less than a number of resource elements configured for data transmissions on the second frequency band.

Some examples of the method, apparatuses, and non-transitory computer-readable medium described herein may further include operations, features, means, or instructions for transmitting, to the base station, an indication of a capability of the UE to transmit feedback messages associated with the second frequency band on the first frequency band.

Some examples of the method, apparatuses, and non-transitory computer-readable medium described herein may further include operations, features, means, or instructions for generating the feedback message using a fast Fourier transform (FFT) and a CP including a length that may be longer than a buffer length of a buffer associated with an inverse FFT (IFFT).

In some examples of the method, apparatuses, and non-transitory computer-readable medium described herein, the length of the of the CP includes an integer multiple of the buffer length associated with the IFFT.

Some examples of the method, apparatuses, and non-transitory computer-readable medium described herein may further include operations, features, means, or instructions for generating the feedback message using a FFT having a time gap greater than a buffer length of a buffer associated with an IFFT.

In some examples of the method, apparatuses, and non-transitory computer-readable medium described herein, the length of the CP includes a length that may be longer than a default length of a CP associated with the first frequency band.

In some examples of the method, apparatuses, and non-transitory computer-readable medium described herein, the subcarrier spacing for the first frequency band may be equal to a subcarrier spacing associated with the second frequency band.

In some examples of the method, apparatuses, and non-transitory computer-readable medium described herein, the subcarrier spacing for the first frequency band includes an integer multiple of a subcarrier spacing associated with the second frequency band.

In some examples of the method, apparatuses, and non-transitory computer-readable medium described herein, transmitting the feedback message may include operations, features, means, or instructions for transmitting the feedback message using a subset of available subcarriers associated with the first frequency band.

In some examples of the method, apparatuses, and non-transitory computer-readable medium described herein, the subcarrier spacing for the first frequency band includes a subcarrier spacing that may be greater than 60 kilohertz and the first frequency band includes a sub 6 gigahertz band associated with a fifth generation radio access technology.

A method for wireless communications at a base station is described. The method may include transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, transmitting a downlink message to the UE on the second frequency band, and receiving, from the UE, the feedback message for the downlink message over the first frequency band using the subcarrier spacing based on the feedback configuration and transmitting the downlink message on the second frequency band, the feedback message including a CP having the indicated length.

An apparatus for wireless communications at a base station is described. The apparatus may include a processor, memory coupled with the processor, and instructions stored in the memory. The instructions may be executable by the processor to cause the apparatus to transmit, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, transmit a downlink message to the UE on the second frequency band, and receive, from the UE, the feedback message for the downlink message over the first frequency band using the subcarrier spacing based on the feedback configuration and transmitting the downlink message on the second frequency band, the feedback message including a CP having the indicated length.

Another apparatus for wireless communications at a base station is described. The apparatus may include means for transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, means for transmitting a downlink message to the UE on the second frequency band, and means for receiving, from the UE, the feedback message for the downlink message over the first frequency band using the subcarrier spacing based on the feedback configuration and transmitting the downlink message on the second frequency band, the feedback message including a CP having the indicated length.

A non-transitory computer-readable medium storing code for wireless communications at a base station is described. The code may include instructions executable by a processor to transmit, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band, transmit a downlink message to the UE on the second frequency band, and receive, from the UE, the feedback message for the downlink message over the first frequency band using the subcarrier spacing based on the feedback configuration and transmitting the downlink message on the second frequency band, the feedback message including a CP having the indicated length.

Some examples of the method, apparatuses, and non-transitory computer-readable medium described herein may further include operations, features, means, or instructions for determining the subcarrier spacing for the first frequency band based on conditions associated with a channel between the base station and the UE.

Some examples of the method, apparatuses, and non-transitory computer-readable medium described herein may further include operations, features, means, or instructions for receiving, from the UE, an indication of a capability of the UE to transmit feedback messages associated with the second frequency band on the first frequency band.

In some examples of the method, apparatuses, and non-transitory computer-readable medium described herein, the subcarrier spacing for the first frequency band may be equal to a subcarrier spacing associated with the second frequency band.

In some examples of the method, apparatuses, and non-transitory computer-readable medium described herein, the subcarrier spacing for the first frequency band may be an integer multiple of a subcarrier spacing associated with the second frequency band.

Some examples of the method, apparatuses, and non-transitory computer-readable medium described herein may further include operations, features, means, or instructions for transmitting, to the UE, control signaling over the first frequency band using the subcarrier spacing based on the feedback configuration.

Some examples of the method, apparatuses, and non-transitory computer-readable medium described herein may further include operations, features, means, or instructions for detecting a failure condition associated with the second frequency band at the UE, where transmitting the control signaling includes transmitting control signaling indicating the UE to perform a recovery procedure based on the failure condition.

In some examples of the method, apparatuses, and non-transitory computer-readable medium described herein, receiving the feedback message may include operations, features, means, or instructions for receiving the feedback message using a subset of available subcarriers associated with the first frequency band.

In some examples of the method, apparatuses, and non-transitory computer-readable medium described herein, the length of the CP may be greater than a length of a CP associated with the second frequency band.

In some examples of the method, apparatuses, and non-transitory computer-readable medium described herein, the subcarrier spacing for the first frequency band includes a subcarrier spacing that may be greater than 60 kilohertz and the first frequency band includes a sub 6 gigahertz band associated with a fifth generation radio access technology.

DETAILED DESCRIPTION

Figure 1:
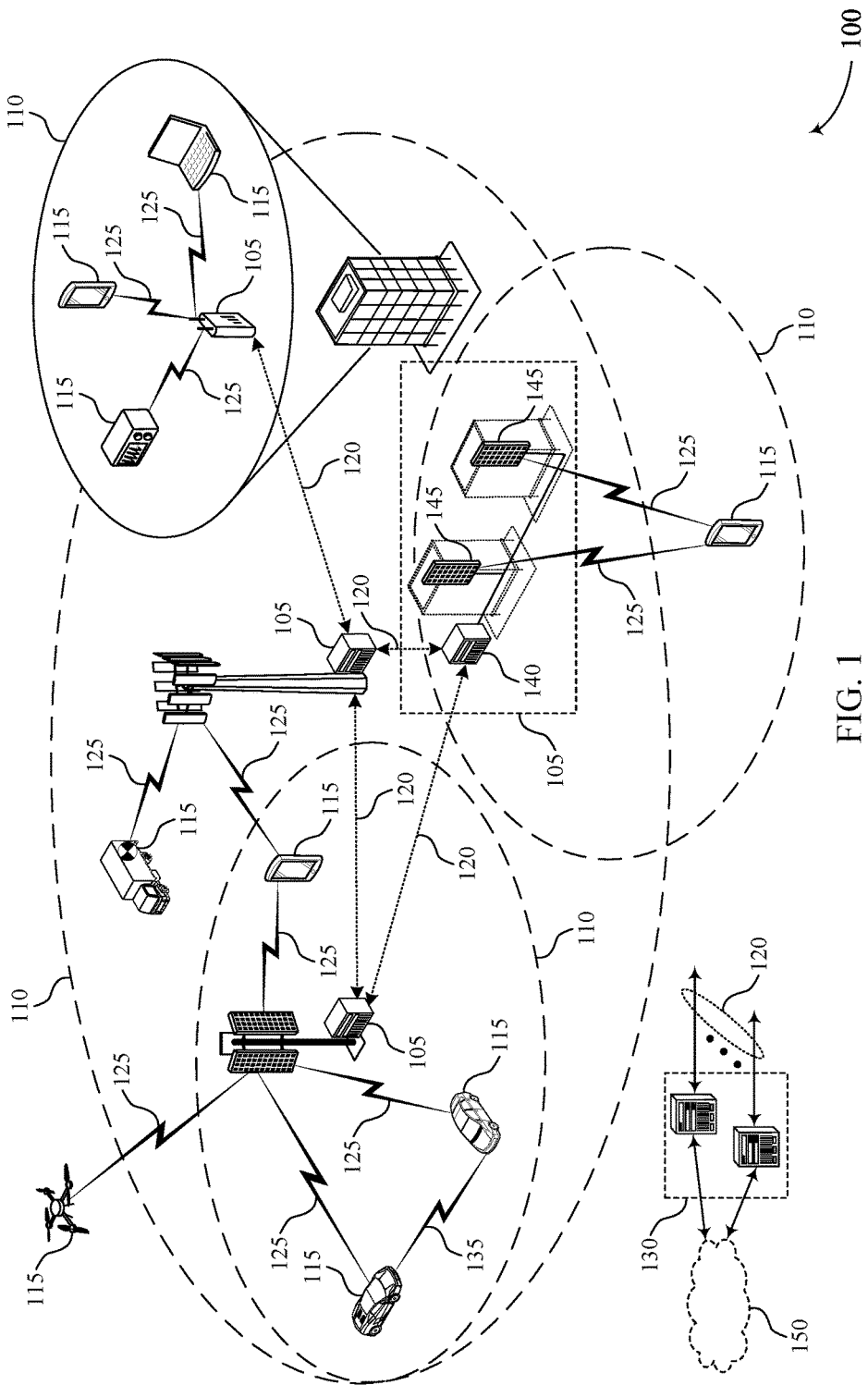
FIG. 1 illustrates an example of a wireless communications system that supports fast feedback techniques for high frequency bands in wireless communications systems in accordance with aspects of the present disclosure.

Some wireless communications systems, such as fifth generation (5G) New Radio (NR) systems, may support devices (e.g., user equipment (UE), base stations) using high frequency bands, including bands in a sub-Terahertz (sub-THz) frequency range. Sub-THz frequency bands may use a narrower beam width than low frequency bands such that changes in orientation, position, or channel conditions may result in beam loss or degradation. As such, standalone applications or systems using the sub-THz frequency range may become difficult to manage or may be unable to support various mobility scenarios or configurations. In some cases, a low frequency band (e.g., a sub-6 Gigahertz (GHz) band) may be configured for control and beam management of high frequency band communications because low frequency bands may provide a more robust connection, better penetration, lower doppler shift and spread, and may have improved reliability in non-line-of-sight applications. In some cases, however, the low frequency band may not support fast feedback, such as symbol-by-symbol feedback, for high frequency bands. For example, a low frequency band may use a smaller subcarrier spacing than a high frequency band such that symbols in the low frequency band are longer than symbols in the high frequency band. In such cases, symbols of the high frequency band may not align in time with symbols of the low frequency band. It may be advantageous to implement a method whereby a device may provide feedback for a high frequency band using a low frequency band within a duration that corresponds to less than or equal to a threshold number of symbols (e.g., 1, 2, 3) in the higher frequency band.

According to some aspects, a base station and a UE may establish a connection using a high frequency band (e.g., in a sub-THz range) and a low frequency band (e.g., in a sub-6 GHz range). The base station may transmit a feedback configuration (e.g., on the low frequency band or on the high frequency band) indicating a subcarrier spacing to use for transmitting feedback for the high frequency band using the low frequency band. For example, the base station may indicate the UE to use a same subcarrier spacing for transmitting feedback on the low frequency band as a subcarrier spacing used for transmitting data on the higher frequency band, such that the UE may provide feedback on a per symbol basis. Alternatively, the base station may indicate the UE to use a subcarrier spacing that is a multiple of a subcarrier spacing used on the high frequency band such that the UE may provide feedback for a group of symbols (e.g., every two, three, or four symbols). For example, if the high frequency is configured to use a subcarrier spacing of 120 kilohertz (kHz), then the base station may indicate the UE to use a subcarrier spacing of 60 kHz for transmitting feedback such that the UE may provide feedback for groups of two symbols associated with the high frequency band. In some cases, however using high subcarrier spacings on a low frequency band may lead to inter-symbol interference.

To mitigate inter-symbol interference, the base station may also indicate a length of a cyclic prefix (CP) for the UE to use for feedback messages transmitted on the low frequency band. For example, the base station may indicate the UE to use a long CP (e.g., a CP that is longer than a CP used on the high frequency band) for feedback messages to reduce inter-symbol interference. The UE may monitor for downlink messages from the base station and may transmit feedback messages accordingly. In some examples, the UE may generate feedback messages using a fast Fourier transform (FFT) and a CP having a length that is longer than (e.g., an integer multiple of) an inverse FFT (IFFT) buffer. In some cases, the fast FFT may be smaller than a default FFT or FFT that may otherwise be used. Alternatively, the UE may generate feedback messages using a FFT and a gap that is larger than the IFFT buffer. In some examples, the UE may transmit the feedback messages using a subset of available subcarriers. Implementing aspects of the present disclosure may enable fast (e.g., per symbol or group of symbols) feedback for high frequency bands which may allow for near real-time beam management, efficient control loops, fast feedback with reduced buffer overhead, which may lead to an increased efficiency of wireless communications, among other benefits.

Aspects of the disclosure are initially described in the context of wireless communications systems. Aspects of the disclosure are further described in the context of resource schemes and a process flow. Aspects of the disclosure are further illustrated by and described with reference to apparatus diagrams, system diagrams, and flowcharts that relate to fast feedback techniques for high frequency bands in wireless communications systems.

FIG. 1 illustrates an example of a wireless communications system 100 that supports fast feedback techniques for high frequency bands in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a CP. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the CP prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105

(e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

In some examples, the wireless communication system 100 may support devices (e.g., UEs 115, base stations 105, etc.) using high frequency bands, including bands in a sub-THz range, also referred to as FRx bands. High frequency bands may be subject to degradation or beam loss due to a narrow beam width, which may lead to difficulty managing services or stand-alone applications which use the high frequency bands. As such, the wireless communication system 100 may support devices using a low frequency band (e.g., a sub-6 GHz or FR1 band) for control, beam management, and feedback associated with a high frequency band (e.g., FR2, FR3, FR5 and beyond).

For example, a base station 105 and a UE 115 may establish a connection using a high frequency band and a low frequency band. The base station 105 may transmit a feedback configuration to the UE 115 indicating the UE 115 to transmit feedback for the high frequency band on the low frequency band. In some examples, the base station 105 may indicate a subcarrier spacing that the UE 115 is to use for transmitting the feedback. For example, the base station 105 may indicate the UE 115 to use a same subcarrier spacing for transmitting the feedback on the low frequency band as is used for transmitting data on the high frequency band, such that the UE 115 may provide feedback on a per symbol basis. Alternatively, the base station 105 may indicate the UE 115 to use a subcarrier spacing that is an integer multiple of a subcarrier spacing used on the high frequency band such that the UE 115 may provide feedback for groups of symbols. The base station 105 may also indicate a length of a CP the UE 115 is to apply to feedback messages transmitted on the low frequency band. For example, the base station 105 may indicate the UE 115 to use a long CP for transmitting feedback to mitigate inter-symbol interference. The UE 115 may monitor the high frequency band for downlink messages transmitted by the base station 105 and transmit feedback according to the feedback configuration. Implementing aspects of the wireless communication system 100 may enable devices to provide fast feedback (e.g., per symbol feedback) for a high frequency band using a low frequency band, which may lead to an increased efficiency of wireless communications services.

Figure 2:
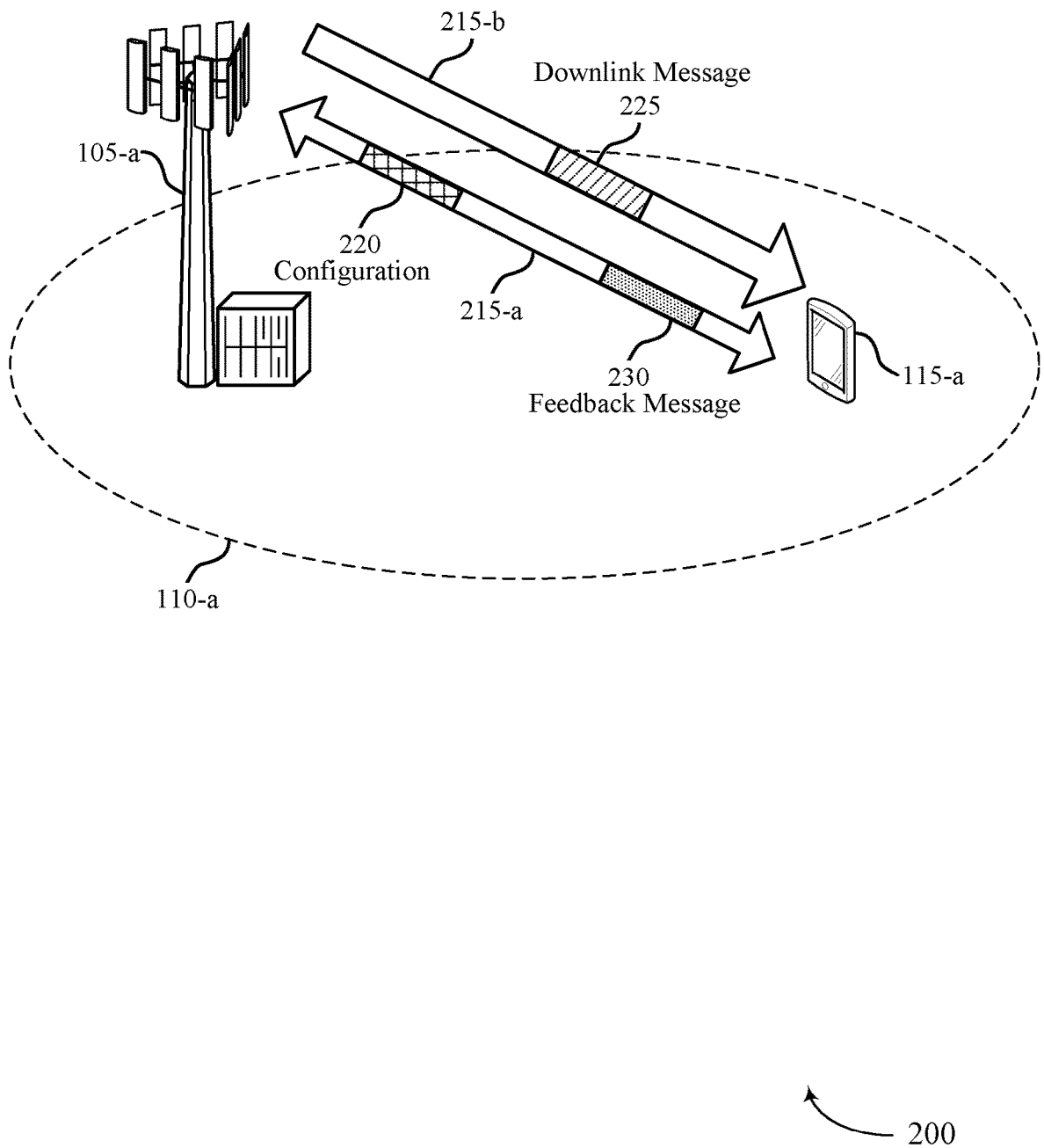
FIG. 2 illustrates an example of a wireless communications system that supports fast feedback techniques for high frequency bands in wireless communications systems in accordance with aspects of the present disclosure.

FIG. 2 illustrates an example of a wireless communications system 200 that supports fast feedback techniques for high frequency bands in wireless communications systems, in accordance with one or more aspects of the present disclosures. In some examples, the wireless communications system 200 may implement aspects of a wireless communications system 100 as described with reference to FIG. 1. The wireless communications system 200 may include a UE 115-a which may be an example of a UE 115 as described with reference to FIG. 1. The wireless communications system 200 may also include a base station 105-a which may be an example of a base station 105 as described with reference to FIG. 1.

The base station 105-a may be associated with a cell providing wireless communications services within a coverage area 110-a. The UE 115-a and the base station 105-a may communicate via a communication link 215-a, a communication link 215-b, or both. In some examples, the communication link 215-a may be associated with a lower frequency band than the communication link 215-a. For example, the communication link 215-a may be associated with a sub-6 GHz frequency band (e.g., FR1) and the communication link 215-b may be associated with a sub-THz band (e.g., FRx). The base station 105-a may use the communication 215-a for control signaling or beam management for the communication 215-b. Similarly, the base station 105-a may configure the UE 115-a to use the communication link 215-a for reporting feedback associated messages received via the communication link 215-b.

For example, the base station 105-a may transmit a feedback configuration 220 to the UE 115-a indicating a subcarrier spacing the UE 115-a is to use for transmitting feedback on the communication link 215-a. In some examples, the base station 105-a may indicate the UE 115-a to use a same subcarrier spacing for transmitting feedback on the communication link 215-a as the is used for transmitting data on the communication link 215-a such that the UE 115-a may transmit feedback on a per symbol basis. Alternatively, the base station 105-a may indicate the UE 115-a to use a subcarrier spacing that is an integer multiple of a subcarrier spacing used for transmitting data on the communication link 215-a such that the UE 115-a may transmit feedback for groups of symbols (e.g., two, three, or four symbols) associated with the communication link 215-b. For example, if the communication link 215-b uses a subcarrier spacing of 240 kHz, the base station 105-a may indicate the UE 115-a to use a subcarrier spacing of 120 kHz such that the UE 115-a may transmit feedback messages including feedback for every two symbols. In some examples, the base station 105-a may determine a subcarrier spacing for the UE 115-a to use based on channel conditions between the base station 105-a and the UE 115-a. For example, if the channel conditions are poor (e.g., below a threshold), the base station 105-a may determine that the UE 115-a is to use a same subcarrier spacing as the communication link 215-b to provide near real-time feedback. In some examples, the UE 115-a may transmit an indication of a capability of the UE 115-a to transmit feedback on the communication link 215-a using a high subcarrier spacing or long CP such that the base station 105-a may transmit the configuration message 220 in response to receiving the capability indication.

In some examples, to help mitigate inter-symbol interference, the base station 105-a may indicate a length of a CP the UE 115-a is to apply to feedback messages transmitted on the communication link 215-a. For example, the base station 105-a may indicate the UE 115-a to apply a CP that is longer than a CP used for transmitting data on the communication link 215-b. In some examples, the base station 105-a may indicate the UE 115-a to apply a CP that is longer than a default length of a CP used for transmitting signals on the communication link 215-*a*. For instance, the default length of the CP may be configured based on the type of RAT, such as NR, used for the communication link 215-*a*, and the base station 105-*a* may indicate the UE 115-*a* to apply a CP longer than the length configured for NR. In some examples, the indicated length may correspond to the indicated subcarrier spacing. For example, the base station 105-*a* may indicate longer CPs for high subcarrier spacings than for low subcarrier spacings.

The base station 105-*a* may transmit a downlink message 225 to the UE 115-*a* via the communication link 216-*b*. The UE 115-*a* may monitor the communication link 215-*b* for downlink messages and may transmit a feedback message 230 on the communication link 215-*a* according to the feedback configuration 220 (e.g., using the indicated subcarrier spacing and a CP having the indicated length). In some examples (e.g., to preserve a symbol length if using a long CP), the UE 115-*a* may generate the feedback message 230 using a small FFT and a CP with a length that is longer than an IFFT buffer. For example, the UE 115-*a* may use a CP with a length that is an integer multiple of the IFFT buffer. Alternatively, the UE 115-*a* may generate the feedback message 230 using a small FFT and a gap having a length greater than a length of an IFFT buffer.

In some examples, the base station 105-*a* may transmit control signaling to the UE 115-*a* via the communication link 215-*a* using the subcarrier spacing based on the feedback configuration. For example, the base station 105-*a* may detect that a failure condition (e.g., a beam loss or beam failure) has occurred for the communication link 215-*b*. Based on the failure condition, the base station 105-*a* may indicate (e.g., over the communication link 215-*a*) the UE 115-*a* perform a recovery procedure, such as a beam sweep procedure for the communication link 215-*b*. Similarly, the base station 105-*a* may transmit other control signaling or parameters associated with the communication link 215-*b* over the communication link 215-*a*. Implementing aspects of the wireless communication system 200 may enable devices to provide fast feedback (e.g., per symbol feedback) for a high frequency band using a low frequency band, which may lead to an increased efficiency of wireless communications services.

Figure 3A:
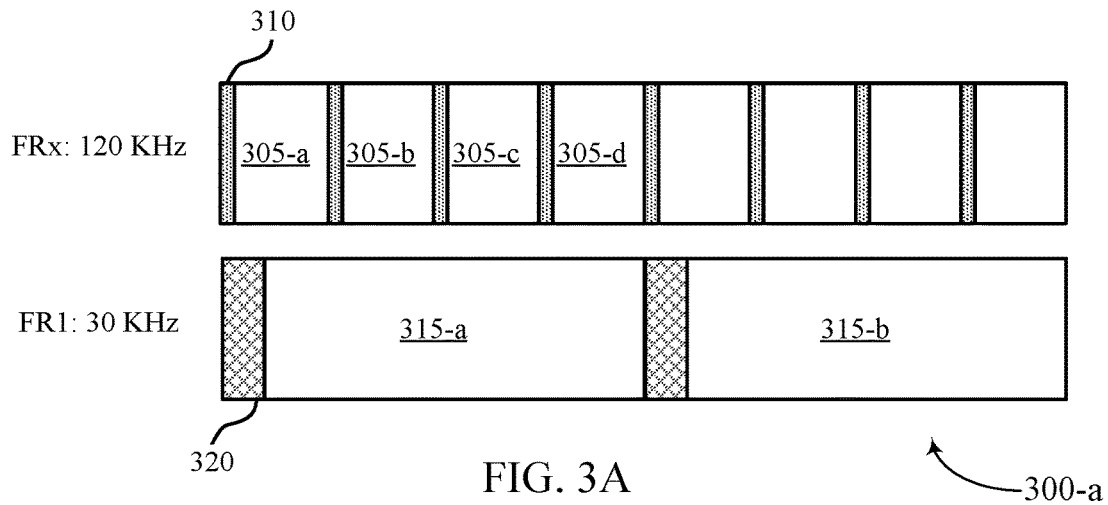
FIG. 3A-C illustrate examples of resource schemes in a system that supports fast feedback techniques for high frequency bands in wireless communications systems in accordance with aspects of the present disclosure.
Figure 3B:
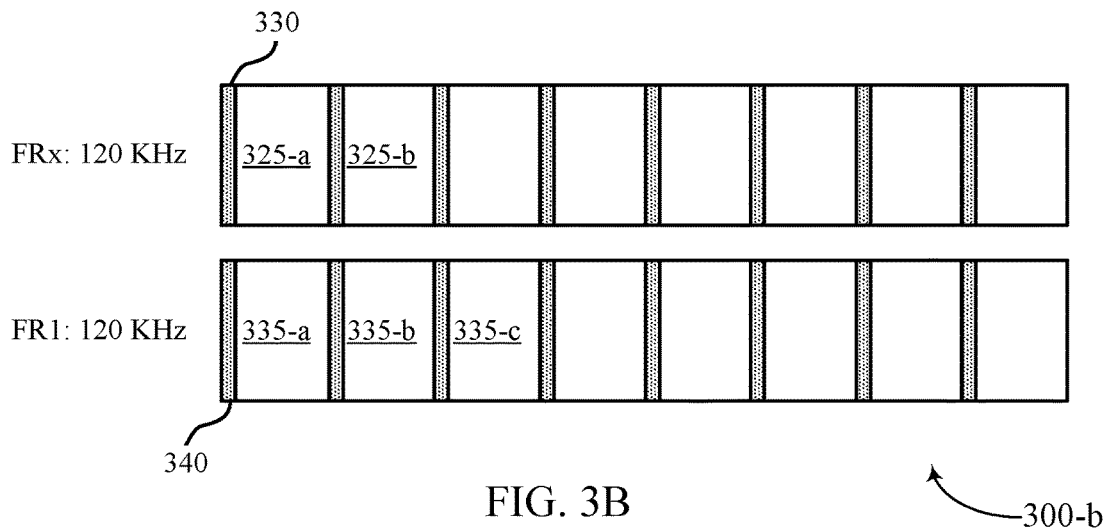
Figure 3C:
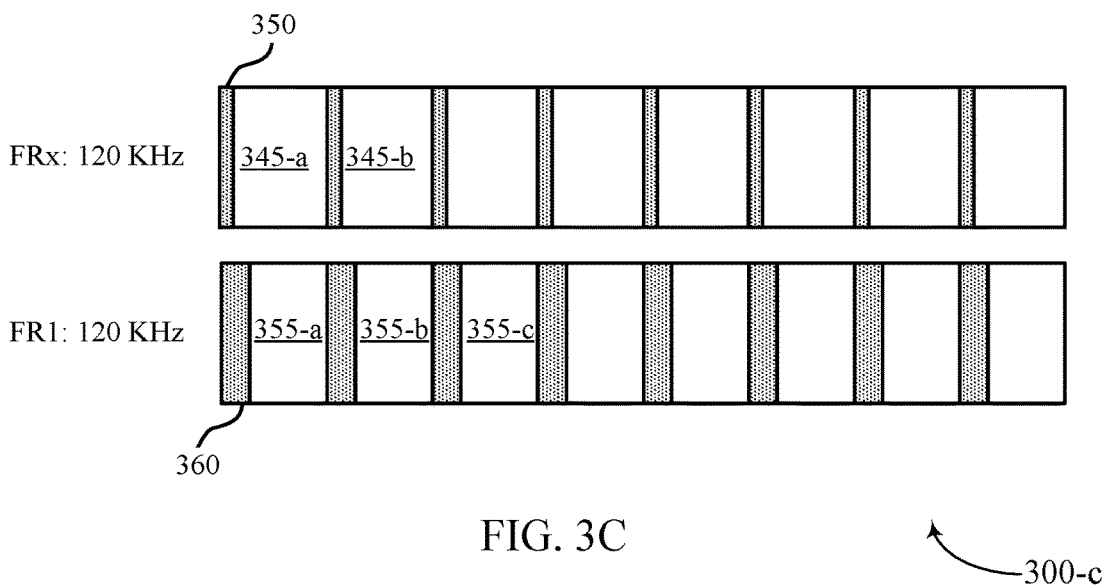

FIG. 3A-C illustrate examples of resource schemes 300-*a*, 300-*b*, and 300-*c* in system that supports fast feedback techniques for high frequency bands in wireless communication systems, in accordance with one or more aspects of the present disclosure. In some examples, the resource schemes 300-*a*, 300-*b*, and 300-*c* may be implemented by a wireless communications 100 or 200, including one or more UEs 115 or base stations 105 as described with reference to FIGS. 1 and 2.

The example of FIG. 3A may include a first frequency band (e.g., an FRx band) with a first subcarrier spacing (e.g., 120 kHz) and a second frequency band (e.g., an FR1 band) with a second subcarrier spacing (e.g., 30 kHz). A UE 115 may be configured to monitor for downlink transmissions on the first frequency band and report feedback on the second frequency band. However, due to a difference in subcarrier spacing (e.g., 120 kHz versus 30 kHz), the UE 115 may be unable to provide feedback on a per symbol basis (e.g., on a per symbol basis relative to the symbols duration in the first frequency band). For example, a base station 105-*a* may transmit data on the first frequency band using symbols 305-*a*, 305-*b*, 305-*c*, and 305-*d*, each symbol having a CP of a same length as a CP 310. In some cases, due to being configured with a lower subcarrier spacing, a UE 115 may transmit signal using long symbols 315-*a* and 315-*b*, each having a CP of a same length as a CP 320. In such instances, the UE 115 may be unable to provide feedback for the symbol 305-*a* until a time associated with the symbol 315-*b*. Accordingly, in the example of FIG. 3A, a UE 115 may be unable to provide feedback on a per symbol basis.

The example of FIG. 3B may include a first frequency band (e.g., an FRx band) with a second frequency band (e.g., an FR1 band) having a same subcarrier spacing (e.g., 120 kHz). A UE 115 may be configured to monitor for downlink transmissions on the first frequency band and report feedback on the second frequency band. A base station 105-*a* may transmit data on the first frequency band using symbols 325-*a* and 325-*b*, each symbol having a CP of a same length as a CP 330. Similarly, a UE 115 may transmit signals using symbols 335-*a*, 335-*b*, and 335-*c*, each symbol having a CP of a same length as a CP 340, which may have a same length as the CP 330. The UE 115 may transmit feedback associated with the symbol 325-*a* using the symbol 335-*b*, and may transmit feedback associated with the symbol 325-*b* using the symbol 335-*c*, such that the UE 115 may transmit feedback on a per symbol basis. However, due to the large subcarrier spacing, the second frequency band may experience inter-symbol interference, leading to reduced efficiency or an increased error rate.

The example of FIG. 3C may include a first frequency band (e.g., an FRx band) with a second frequency band (e.g., an FR1 band) having a same subcarrier spacing (e.g., 120 kHz). A UE 115 may be configured to monitor for downlink transmissions on the first frequency band and report feedback on the second frequency band. A base station 105-*a* may transmit data on the first frequency band using symbols 345-*a* and 345-*b*, each symbol having a CP of a same length as a CP 350. Similarly, the UE 115 may transmit signals using symbols 355-*a*, 355-*b*, 355-*c*. To help reduce or mitigate inter-symbol interference, the UE 115 may apply, to each symbol, a CP having a same length as a CP 360, which may be longer than the CP 350. Accordingly, the UE 115 may transmit feedback associated with the 345-*a* using the symbol 355-*b* and feedback associated with the symbol 345-*b* using the symbol 355-*c*, which may enable near real-time (e.g., symbol-by-symbol) for the first frequency band using the second frequency band. Implementing aspects of the resource schemes 300-*a*, 300-*b*, and 300-*c* may enable devices to provide fast feedback (e.g., per symbol or group of symbol feedback) for a high frequency band using a low frequency band, which may lead to an increased efficiency of wireless communications services.

Figure 4:
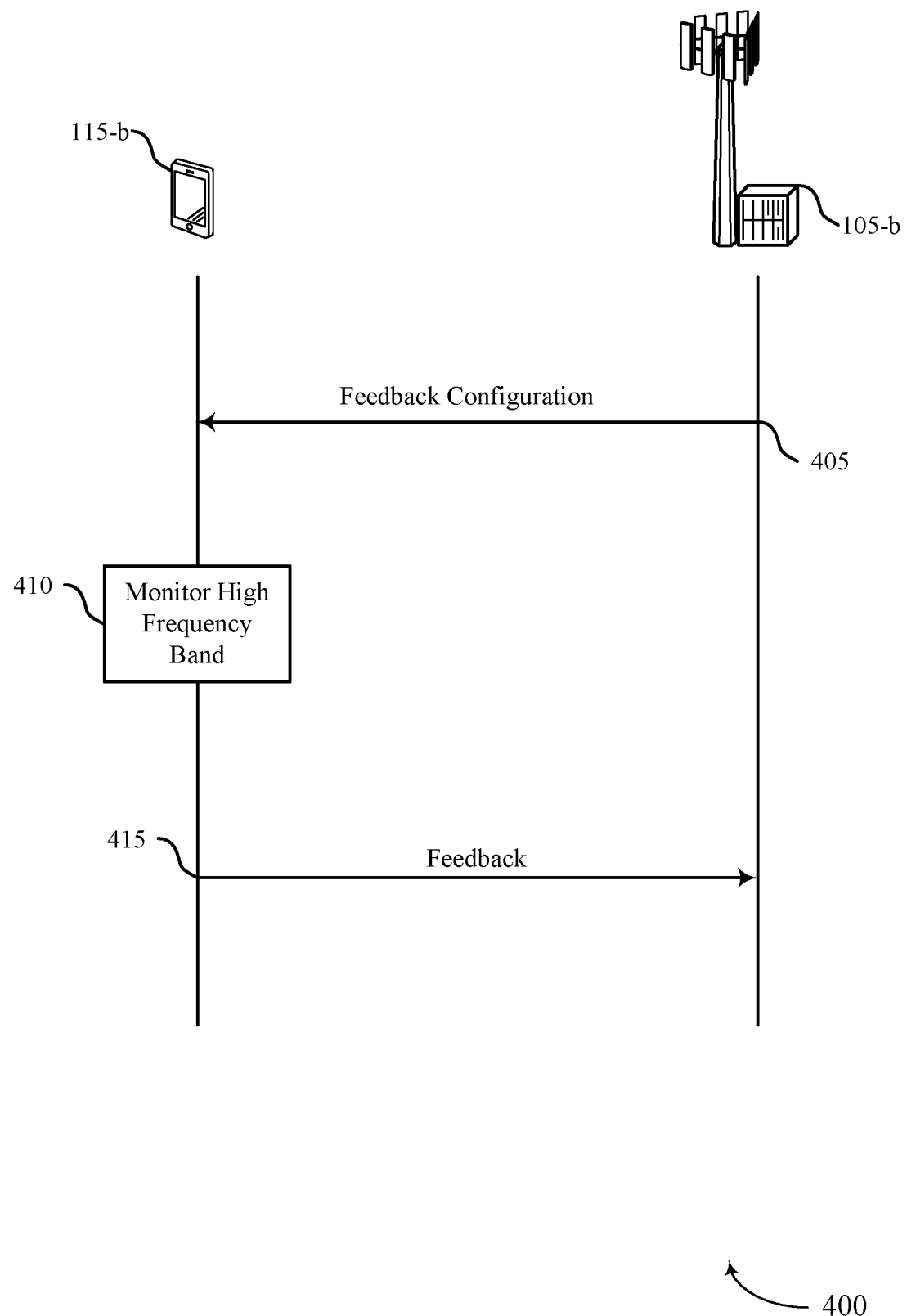
FIG. 4 illustrates an example of a process flow in a system that supports fast feedback techniques for high frequency bands in wireless communications systems in accordance with aspects of the present disclosure.

FIG. 4 illustrates an example of a process flow 400 in a system that supports fast feedback techniques for high frequency bands in wireless communications systems, in accordance with one or more aspects of the wireless communications systems 100 or 200, or the resource schemes 300 as described with reference to FIGS. 1-3. The process flow 400 may include a UE 115-*b* and a base station 105-*b* which may be examples of the corresponding devices described herein. In some examples, the UE 115-*b* and the base station 105-*b* may communicate using a high frequency band (e.g., an FRx or sub-THz band) and a low frequency band (e.g., an FR1 or sub-6 GHz band). Alternative examples of the following may be implemented in which some processes are performed in a different order than described or are not performed at all. In some examples, the processes may include additional features not mentioned below, or further processes may be added.

At 405, the base station 105-*b* may transmit a feedback configuration to the UE 115-*b* indicating a configuration for the UE 115-*b* to use to transmit feedback for the high frequency band on the low frequency band. In some examples, the base station 105-*b* may indicate the UE 115-*b* to use a subcarrier spacing on the low frequency band equal to a subcarrier spacing used on the high frequency band. Alternatively, the base station 105-*b* may indicate the UE 115-*b* to use a subcarrier spacing that is an integer multiple of a subcarrier spacing used on the high frequency band (e.g., such that feedback is transmitted for groups of symbols). In some examples, the base station 105-*a* may indicate a length of a CP the UE 115-*b* is to apply to feedback messages transmitting on the low frequency band. In some examples, the length of the CP may be greater than a length of a CP used for transmitting data on the high frequency band. Accordingly, feedback transmitted on the low frequency band may use fewer resource elements than data transmitted on the high frequency band.

At 410, the UE 115-*b* may monitor the high frequency band for downlink message transmitted by the base station 105-*b*. In some examples, the UE 115-*b* may receive downlink messages on the high frequency band or may fail to receive or decode the downlink messages.

At 415, in response to monitoring for downlink messages, the UE 115-*b* may transmit a feedback message to the base station 105-*b*. In some examples, the UE 115-*b* may transmit feedback on a per symbol basis based on the subcarrier spacing indicated by the base station 105-*b*. In some examples, the UE 115-*b* may generate the feedback message using a small FFT and a time gap larger than an IFFT buffer. In some examples, the UE 115-*b* may generate the feedback message using a small FFT and a CP having the indicated length such that the length is an integer multiple of a buffer length of an IFFT buffer. Implementing aspects of the process flow 400 may enable devices to provide fast feedback (e.g., per symbol feedback) for a high frequency band using a low frequency band, which may lead to an increased efficiency of wireless communications services.

Figure 5:
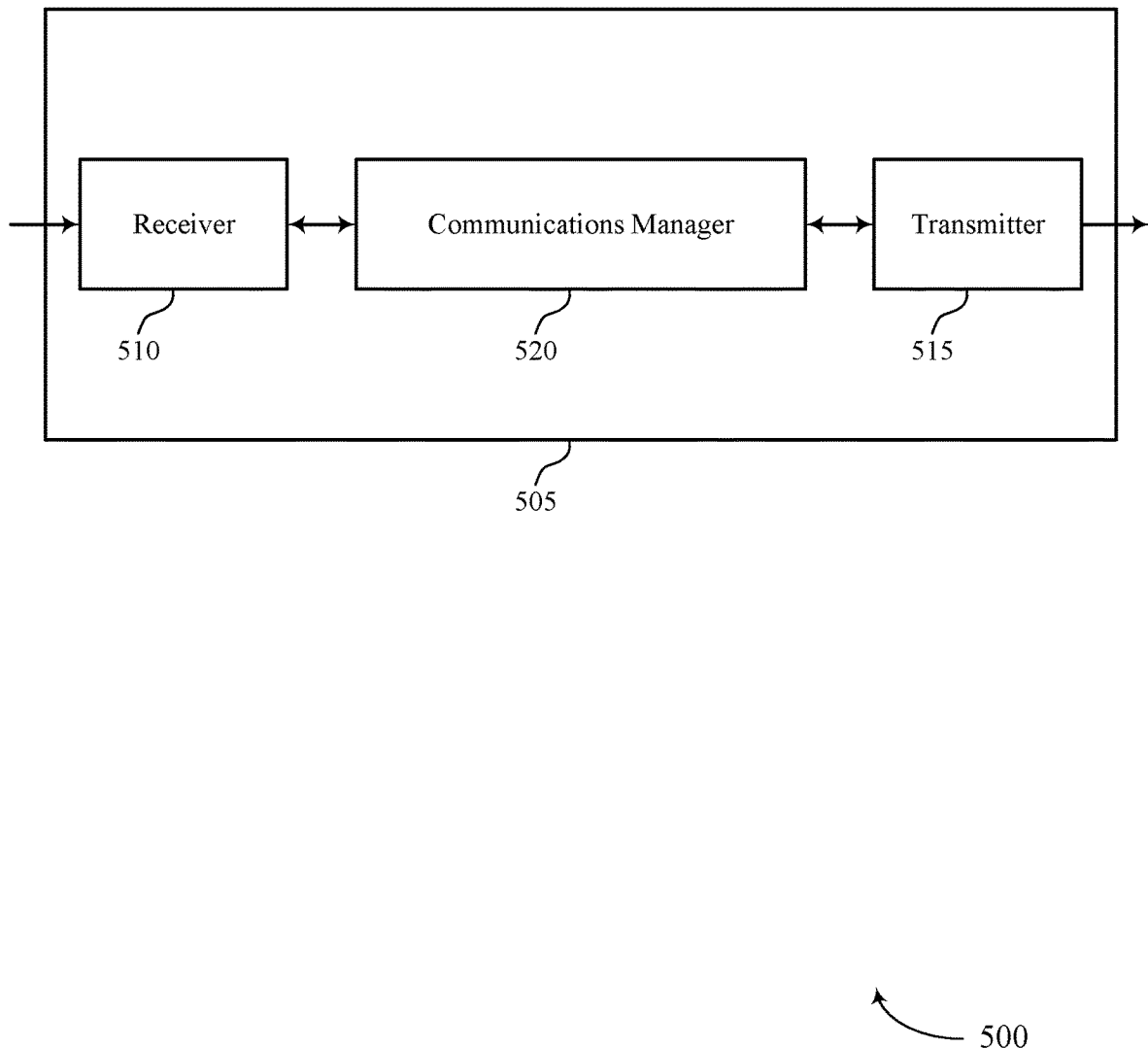
FIGS. 5 and 6 show block diagrams of devices that support fast feedback techniques for high frequency bands in wireless communications systems in accordance with aspects of the present disclosure.

FIG. 5 shows a block diagram 500 of a device 505 that supports fast feedback techniques for high frequency bands in wireless communications systems in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to fast feedback techniques for high frequency bands in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to fast feedback techniques for high frequency bands in wireless communications systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of fast feedback techniques for high frequency bands in wireless communications systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The communications manager 520 may be configured as or otherwise support a means for monitoring the second frequency band for a downlink message from the base station. The communications manager 520 may be configured as or otherwise support a means for transmitting, to the base station, the feedback message for the downlink message over the first frequency band using the indicated subcarrier spacing based on the feedback configuration and on the monitoring the second frequency band, the feedback message including a CP having the indicated length.

By including or configuring the communications manager 520 in accordance with examples as described herein, the device 505 (e.g., a processor controlling or otherwise coupled to the receiver 510, the transmitter 515, the communications manager 520, or a combination thereof) may support fast feedback techniques for high frequency bands such that the device 505 may reduce processing cycles, reduce power consumption, and may allow for more efficient resource usage or an increased reliability of wireless communications services, among other benefits.

Figure 6:
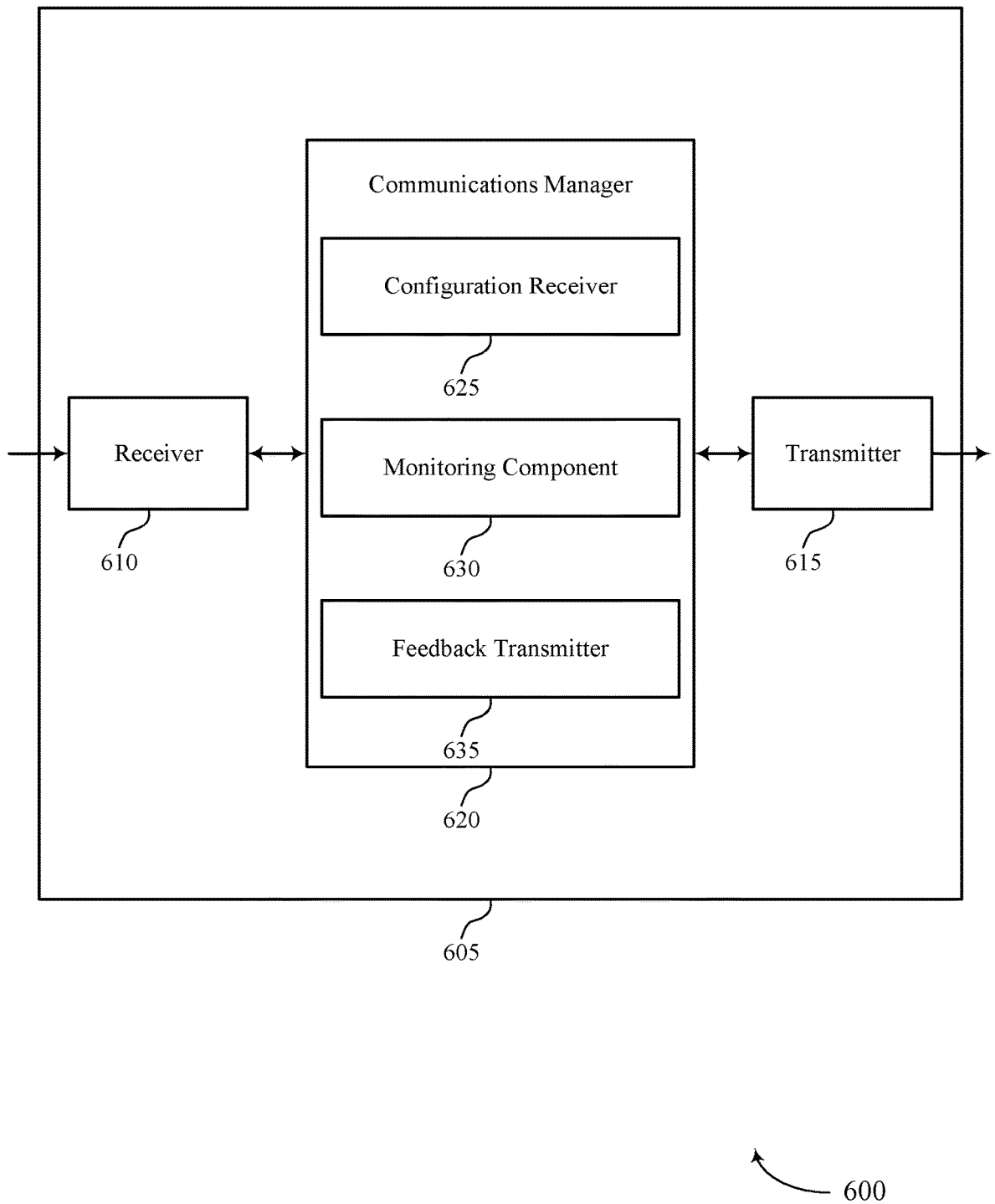

FIG. 6 shows a block diagram 600 of a device 605 that supports fast feedback techniques for high frequency bands in wireless communications systems in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to fast feedback techniques for high frequency bands in wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to fast feedback techniques for high frequency bands in wireless communications systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of fast feedback techniques for high frequency bands in wireless communications systems as described herein. For example, the communications manager 620 may include a configuration receiver 625, a monitoring component 630, a feedback transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The configuration receiver 625 may be configured as or otherwise support a means for receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The monitoring component 630 may be configured as or otherwise support a means for monitoring the second frequency band for a downlink message from the base station. The feedback transmitter 635 may be configured as or otherwise support a means for transmitting, to the base station, the feedback message for the downlink message over the first frequency band using the indicated subcarrier spacing based on the feedback configuration and on the monitoring the second frequency band, the feedback message including a CP having the indicated length.

Figure 7:
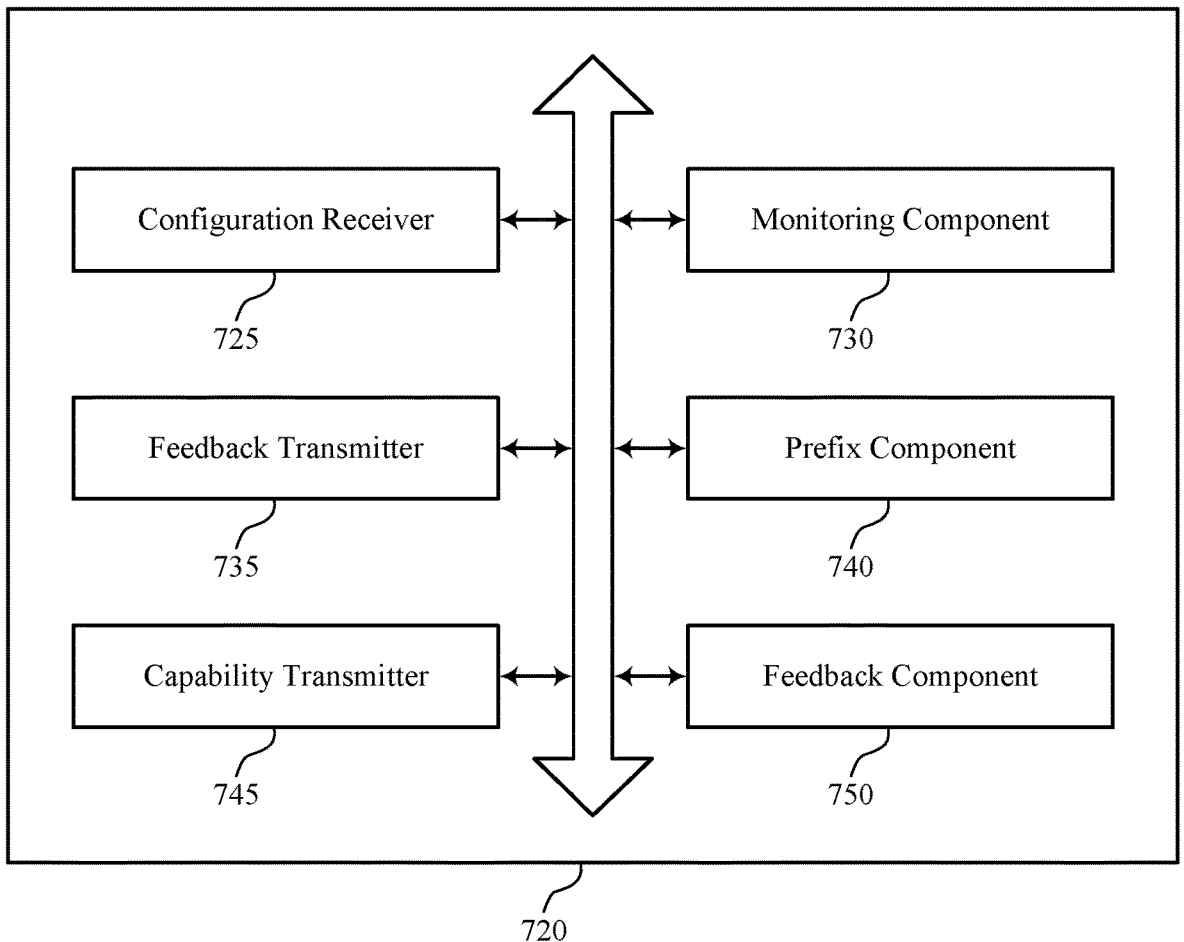
FIG. 7 shows a block diagram of a communications manager that supports fast feedback techniques for high frequency bands in wireless communications systems in accordance with aspects of the present disclosure.

FIG. 7 shows a block diagram 700 of a communications manager 720 that supports fast feedback techniques for high frequency bands in wireless communications systems in accordance with aspects of the present disclosure. The communications manager 720 may be an example of aspects of a communications manager 520, a communications manager 620, or both, as described herein. The communications manager 720, or various components thereof, may be an example of means for performing various aspects of fast feedback techniques for high frequency bands in wireless communications systems as described herein. For example, the communications manager 720 may include a configuration receiver 725, a monitoring component 730, a feedback transmitter 735, a prefix component 740, a capability transmitter 745, a feedback component 750, or any combination thereof. Each of these components may communicate, directly or indirectly, with one another (e.g., via one or more buses).

The communications manager 720 may support wireless communications at a UE in accordance with examples as disclosed herein. The configuration receiver 725 may be configured as or otherwise support a means for receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The monitoring component 730 may be configured as or otherwise support a means for monitoring the second frequency band for a downlink message from the base station. The feedback transmitter 735 may be configured as or otherwise support a means for transmitting, to the base station, the feedback message for the downlink message over the first frequency band using the indicated subcarrier spacing based on the feedback configuration and on the monitoring the second frequency band, the feedback message including a CP having the indicated length.

In some examples, to support transmitting the feedback message, the prefix component 740 may be configured as or otherwise support a means for applying, to the feedback message, a CP having the indicated length corresponding to a long CP, where the feedback message includes a number of resource elements that is less than a number of resource elements configured for data transmissions on the second frequency band.

In some examples, the capability transmitter 745 may be configured as or otherwise support a means for transmitting, to the base station, an indication of a capability of the UE to transmit feedback messages associated with the second frequency band on the first frequency band.

In some examples, the feedback component 750 may be configured as or otherwise support a means for generating the feedback message using a FFT and a CP including a length that is longer than a buffer length of a buffer associated with an IFFT. In some examples, the length of the CP includes an integer multiple of the buffer length of the buffer associated with the IFFT.

In some examples, the feedback component 750 may be configured as or otherwise support a means for generating the feedback message using a FFT having a time gap greater than a buffer length of a buffer associated with an IFFT.

In some examples, the length of the CP may include a length that is longer than a default length of a CP associated with the first frequency band. In some examples, the subcarrier spacing for the first frequency band is equal to a subcarrier spacing associated with the second frequency band. In some examples, the subcarrier spacing for the first frequency band includes an integer multiple of a subcarrier spacing associated with the second frequency band.

In some examples, to support transmitting the feedback message, the feedback transmitter 735 may be configured as or otherwise support a means for transmitting the feedback message using a subset of available subcarriers associated with the first frequency band.

In some examples, the subcarrier spacing for the first frequency band includes a subcarrier spacing that is greater than 60 kilohertz. In some examples, the first frequency band includes a sub-6 gigahertz band associated with a fifth generation radio access technology.

Figure 8:
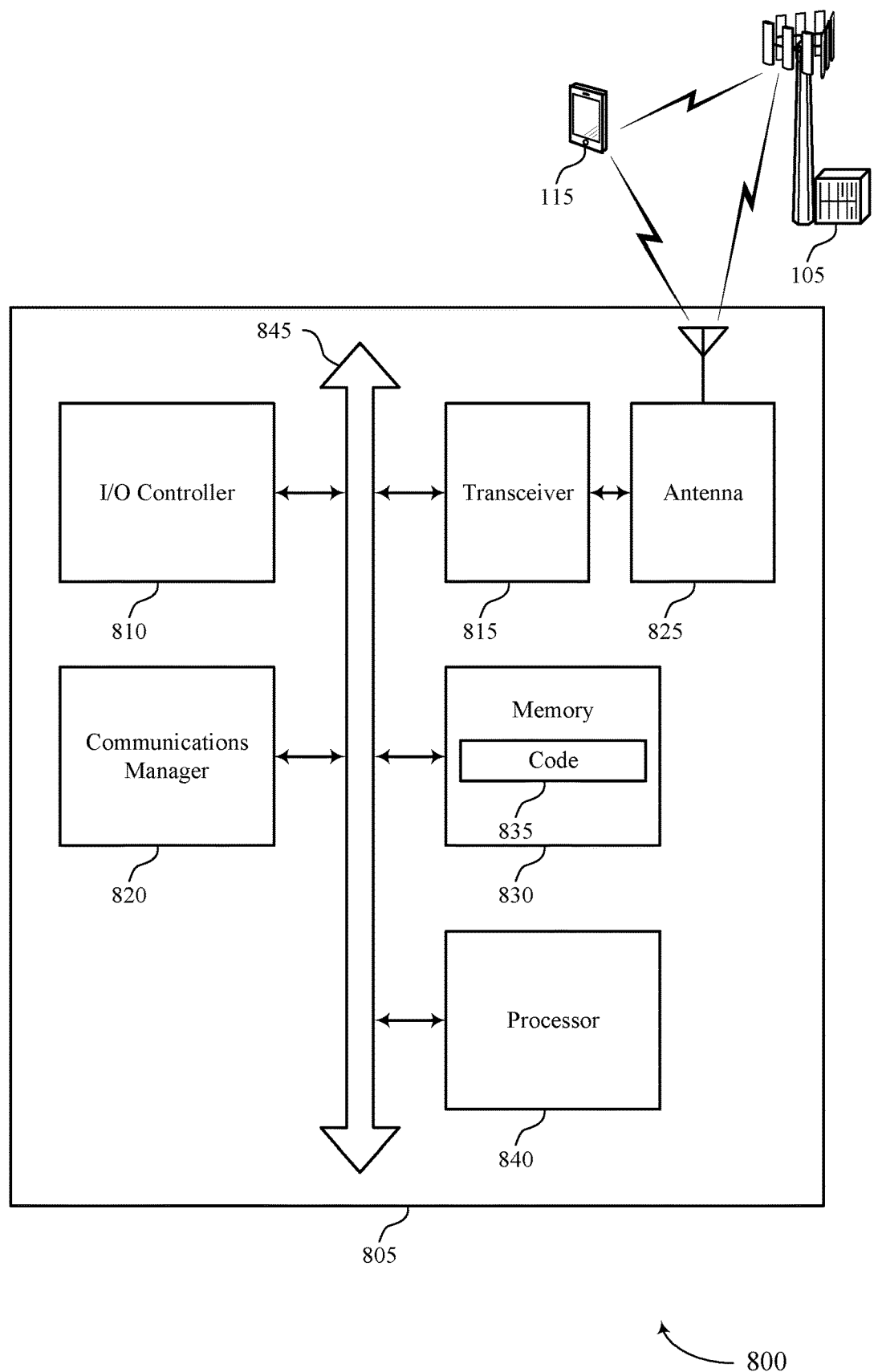
FIG. 8 shows a diagram of a system including a device that supports fast feedback techniques for high frequency bands in wireless communications systems in accordance with aspects of the present disclosure.

FIG. 8 shows a diagram of a system 800 including a device 805 that supports fast feedback techniques for high frequency bands in wireless communications systems in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting fast feedback techniques for high frequency bands in wireless communications systems). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The communications manager 820 may be configured as or otherwise support a means for monitoring the second frequency band for a downlink message from the base station. The communications manager 820 may be configured as or otherwise support a means for transmitting, to the base station, the feedback message for the downlink message over the first frequency band using the indicated subcarrier spacing based on the feedback configuration and on the monitoring the second frequency band, the feedback message including a CP having the indicated length.

By including or configuring the communications manager 820 in accordance with examples as described herein, the device 805 may support fast feedback techniques for high frequency bands such that the device 805 may exhibit a reduced processing, a reduced power consumption, a more efficient resource usage or an increased reliability of wireless communications services, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of fast feedback techniques for high frequency bands in wireless communications systems as described herein, or the processor 840 and the memory 830 may be otherwise configured to perform or support such operations.

Figure 9:
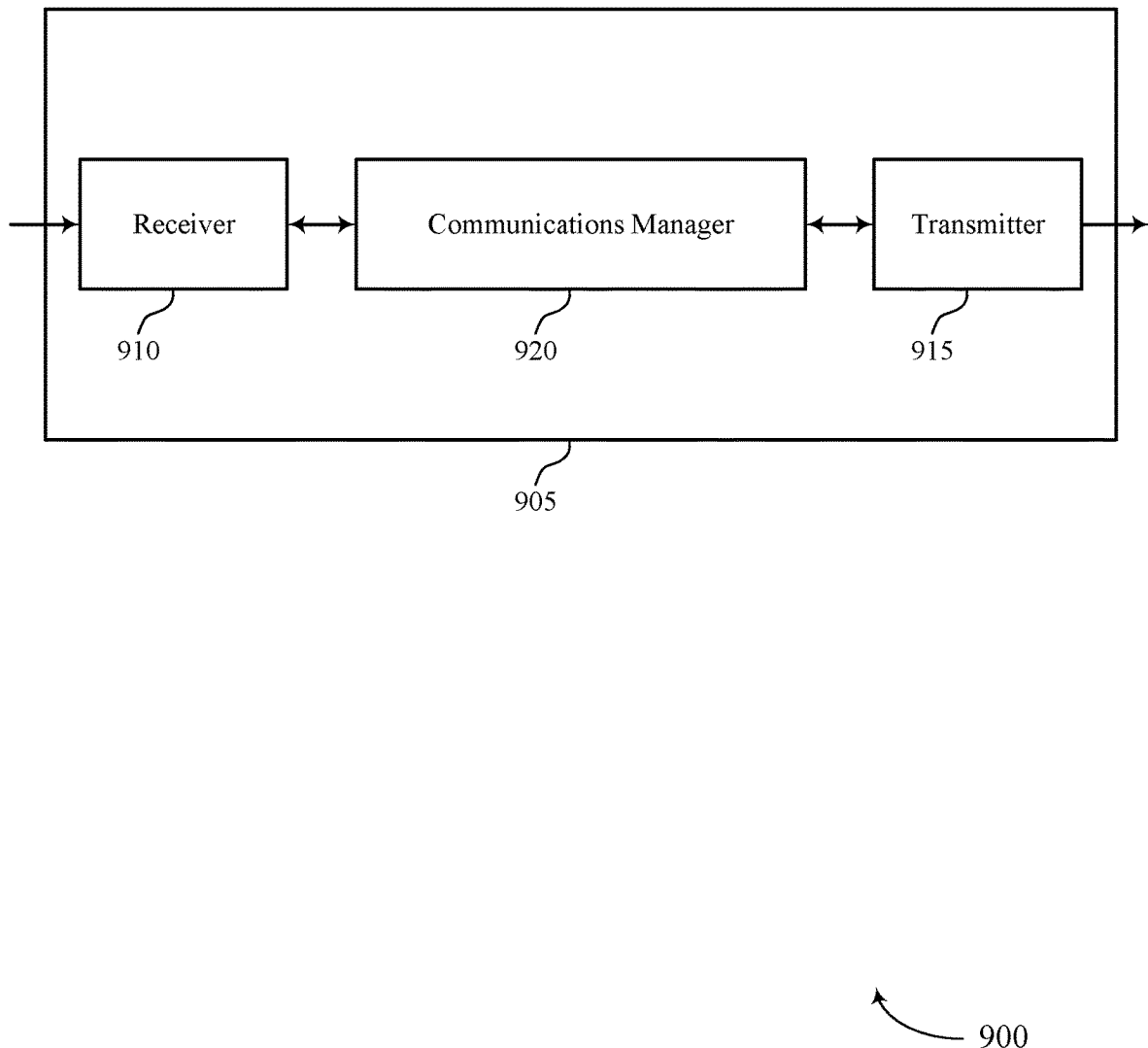
FIGS. 9 and 10 show block diagrams of devices that support fast feedback techniques for high frequency bands in wireless communications systems in accordance with aspects of the present disclosure.

FIG. 9 shows a block diagram 900 of a device 905 that supports fast feedback techniques for high frequency bands in wireless communications systems in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to fast feedback techniques for high frequency bands in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to fast feedback techniques for high frequency bands in wireless communications systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of fast feedback techniques for high frequency bands in wireless communications systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The communications manager 920 may be configured as or otherwise support a means for transmitting a downlink message to the UE on the second frequency band. The communications manager 920 may be configured as or otherwise support a means for receiving, from the UE, the feedback message for the downlink message over the first frequency band using the indicated subcarrier spacing based on the feedback configuration and transmitting the downlink message on the second frequency band, the feedback message including a CP having the indicated length.

By including or configuring the communications manager 920 in accordance with examples as described herein, the device 905 (e.g., a processor controlling or otherwise coupled to the receiver 910, the transmitter 915, the communications manager 920, or a combination thereof) may support fast feedback techniques for high frequency bands such that the device 905 may exhibit a reduced processing, a reduced power consumption, a more efficient resource usage or an increased reliability of wireless communications services, among other benefits.

Figure 10:
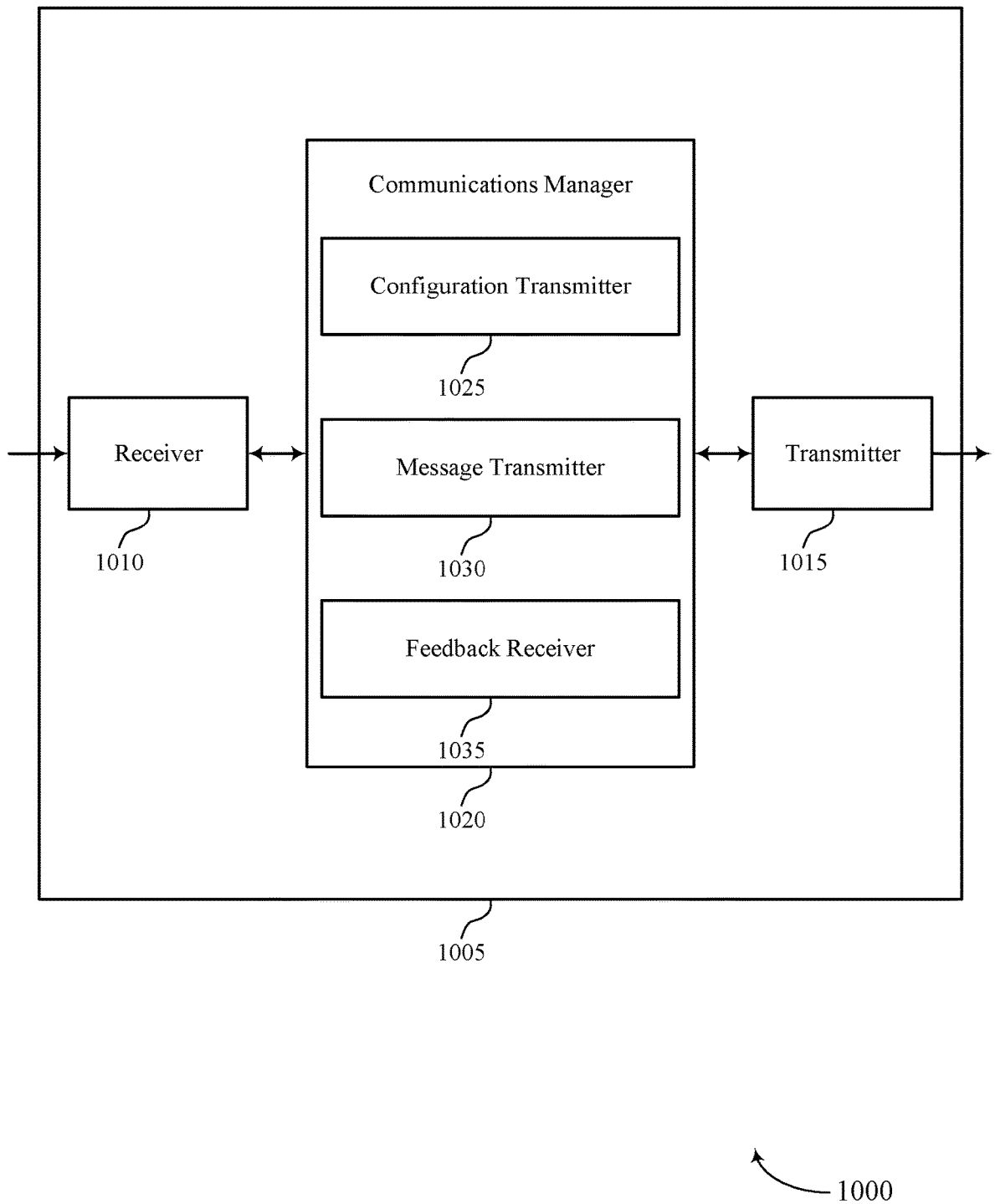

FIG. 10 shows a block diagram 1000 of a device 1005 that supports fast feedback techniques for high frequency bands in wireless communications systems in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to fast feedback techniques for high frequency bands in wireless communications systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to fast feedback techniques for high frequency bands in wireless communications systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of fast feedback techniques for high frequency bands in wireless communications systems as described herein. For example, the communications manager 1020 may include a configuration transmitter 1025, a message transmitter 1030, a feedback receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The configuration transmitter 1025 may be configured as or otherwise support a means for transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The message transmitter 1030 may be configured as or otherwise support a means for transmitting a downlink message to the UE on the second frequency band. The feedback receiver 1035 may be configured as or otherwise support a means for receiving, from the UE, the feedback message for the downlink message over the first frequency band using the indicated subcarrier spacing based on the feedback configuration and transmitting the downlink message on the second frequency band, the feedback message including a CP having the indicated length.

Figure 11:
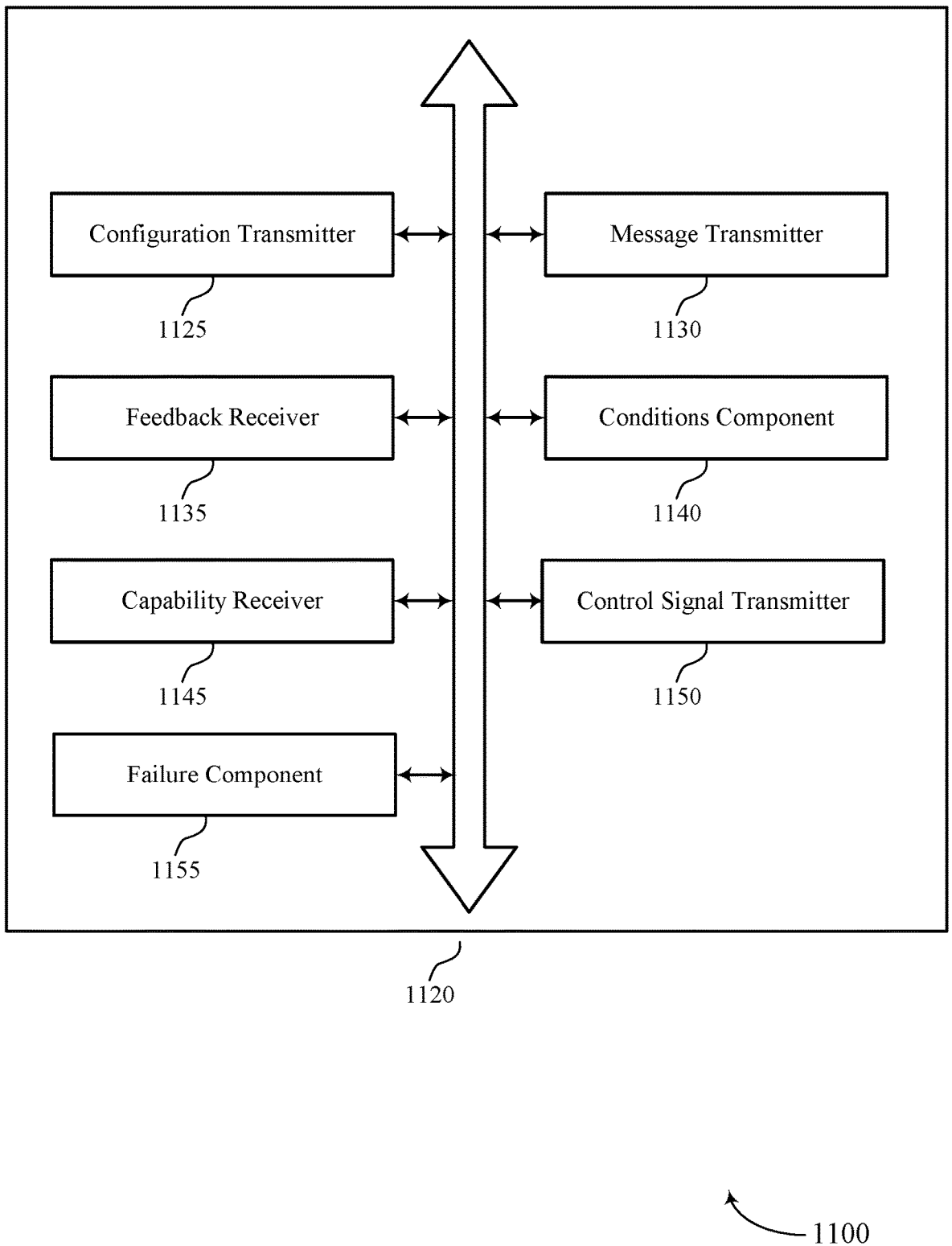
FIG. 11 shows a block diagram of a communications manager that supports fast feedback techniques for high frequency bands in wireless communications systems in accordance with aspects of the present disclosure.

FIG. 11 shows a block diagram 1100 of a communications manager 1120 that supports fast feedback techniques for high frequency bands in wireless communications systems in accordance with aspects of the present disclosure. The communications manager 1120 may be an example of aspects of a communications manager 920, a communications manager 1020, or both, as described herein. The communications manager 1120, or various components thereof, may be an example of means for performing various aspects of fast feedback techniques for high frequency bands in wireless communications systems as described herein. For example, the communications manager 1120 may include a configuration transmitter 1125, a message transmitter 1130, a feedback receiver 1135, a conditions component 1140, a capability receiver 1145, a control signal transmitter 1150, a failure component 1155, or any combination thereof. Each of these components may communicate, directly or indirectly, with one another (e.g., via one or more buses).

The communications manager 1120 may support wireless communications at a base station in accordance with examples as disclosed herein. The configuration transmitter 1125 may be configured as or otherwise support a means for transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The message transmitter 1130 may be configured as or otherwise support a means for transmitting a downlink message to the UE on the second frequency band. The feedback receiver 1135 may be configured as or otherwise support a means for receiving, from the UE, the feedback message for the downlink message over the first frequency band using the indicated subcarrier spacing based on the feedback configuration and transmitting the downlink message on the second frequency band, the feedback message including a CP having the indicated length.

In some examples, the conditions component 1140 may be configured as or otherwise support a means for determining the subcarrier spacing for the first frequency based on conditions associated with a channel between the base station and the UE.

In some examples, the capability receiver 1145 may be configured as or otherwise support a means for receiving, from the UE, an indication of a capability of the UE to transmit feedback messages associated with the second frequency band on the first frequency band. In some examples, the subcarrier spacing for the first frequency band is equal to a subcarrier spacing associated with the second frequency band. In some examples, the subcarrier spacing for the first frequency band is an integer multiple of a subcarrier spacing associated with the second frequency band.

In some examples, to support receiving the feedback message, the feedback receiver 1135 may be configured as or otherwise support a means for receiving the feedback message using a subset of available subcarriers associated with the first frequency band. In some examples, the length of the CP is greater than a length of a CP associated with the second frequency band. In some examples, the subcarrier spacing for the first frequency band includes a subcarrier spacing that is greater than 60 kilohertz. In some examples, the first frequency band includes a sub-6 gigahertz band associated with a fifth generation radio access technology.

In some examples, the control signal transmitter 1150 may be configured as or otherwise support a means for transmitting, to the UE, control signaling over the first frequency band using the subcarrier spacing based on the feedback configuration.

In some examples, the failure component 1155 may be configured as or otherwise support means for detecting a failure condition associated with the second frequency band at the UE, where transmitting the control signaling includes transmitting control signaling indicating the UE to perform a recovery procedure based on the failure condition.

Figure 12:
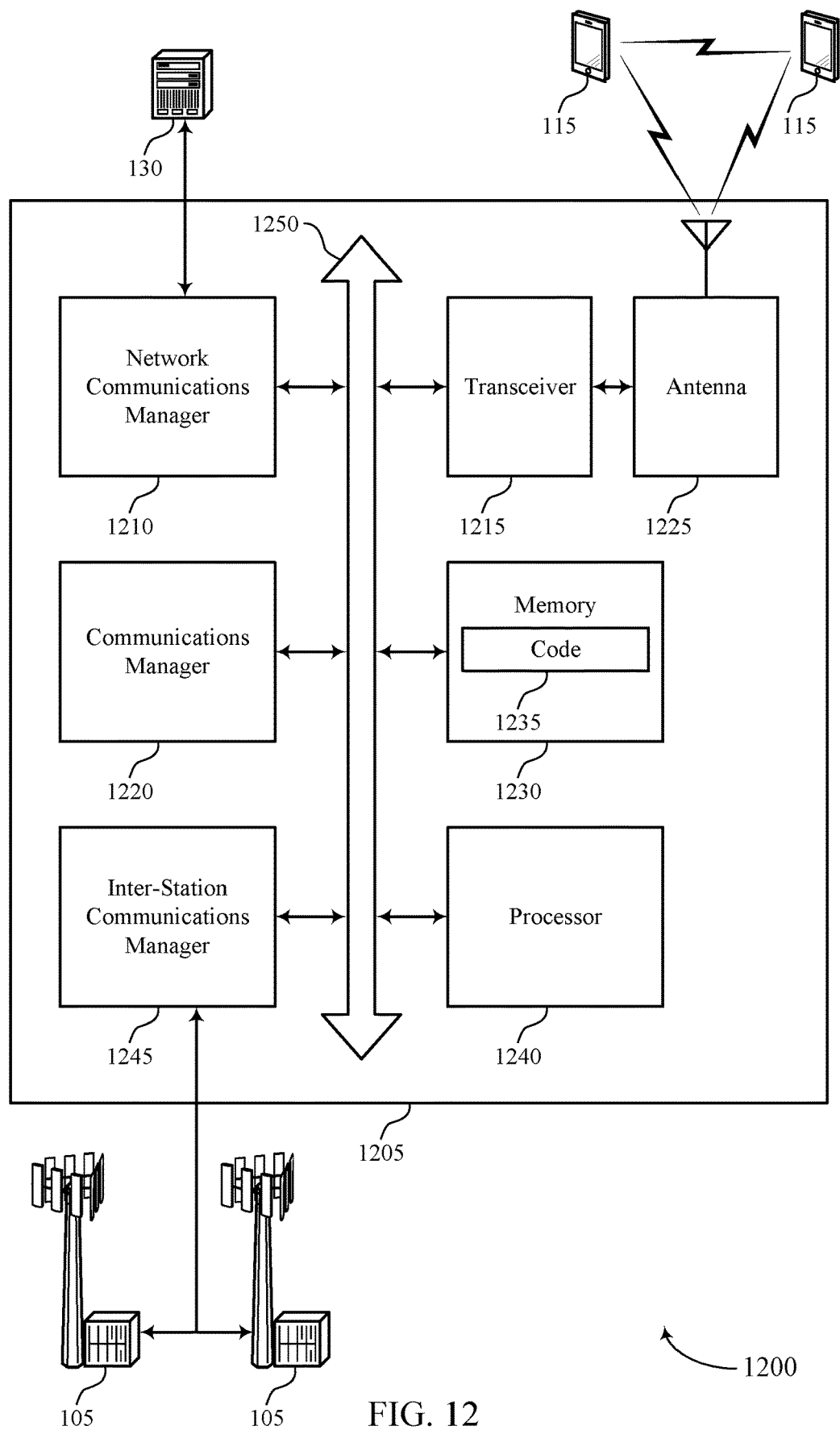
FIG. 12 shows a diagram of a system including a device that supports fast feedback techniques for high frequency bands in wireless communications systems in accordance with aspects of the present disclosure.

FIG. 12 shows a diagram of a system 1200 including a device 1205 that supports fast feedback techniques for high frequency bands in wireless communications systems in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting fast feedback techniques for high frequency bands in wireless communications systems). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The communications manager 1220 may be configured as or otherwise support a means for transmitting a downlink message to the UE on the second frequency band. The communications manager 1220 may be configured as or otherwise support a means for receiving, from the UE, the feedback message for the downlink message over the first frequency band using the indicated subcarrier spacing based on the feedback configuration and transmitting the downlink message on the second frequency band, the feedback message including a CP having the indicated length.

By including or configuring the communications manager 1220 in accordance with examples as described herein, the device 1205 may fast feedback techniques for high frequency bands such that the device 1205 may exhibit a reduced processing, a reduced power consumption, a more efficient resource usage or an increased reliability of wireless communications services, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of fast feedback techniques for high frequency bands in wireless communications systems as described herein, or the processor 1240 and the memory 1230 may be otherwise configured to perform or support such operations.

Figure 13:
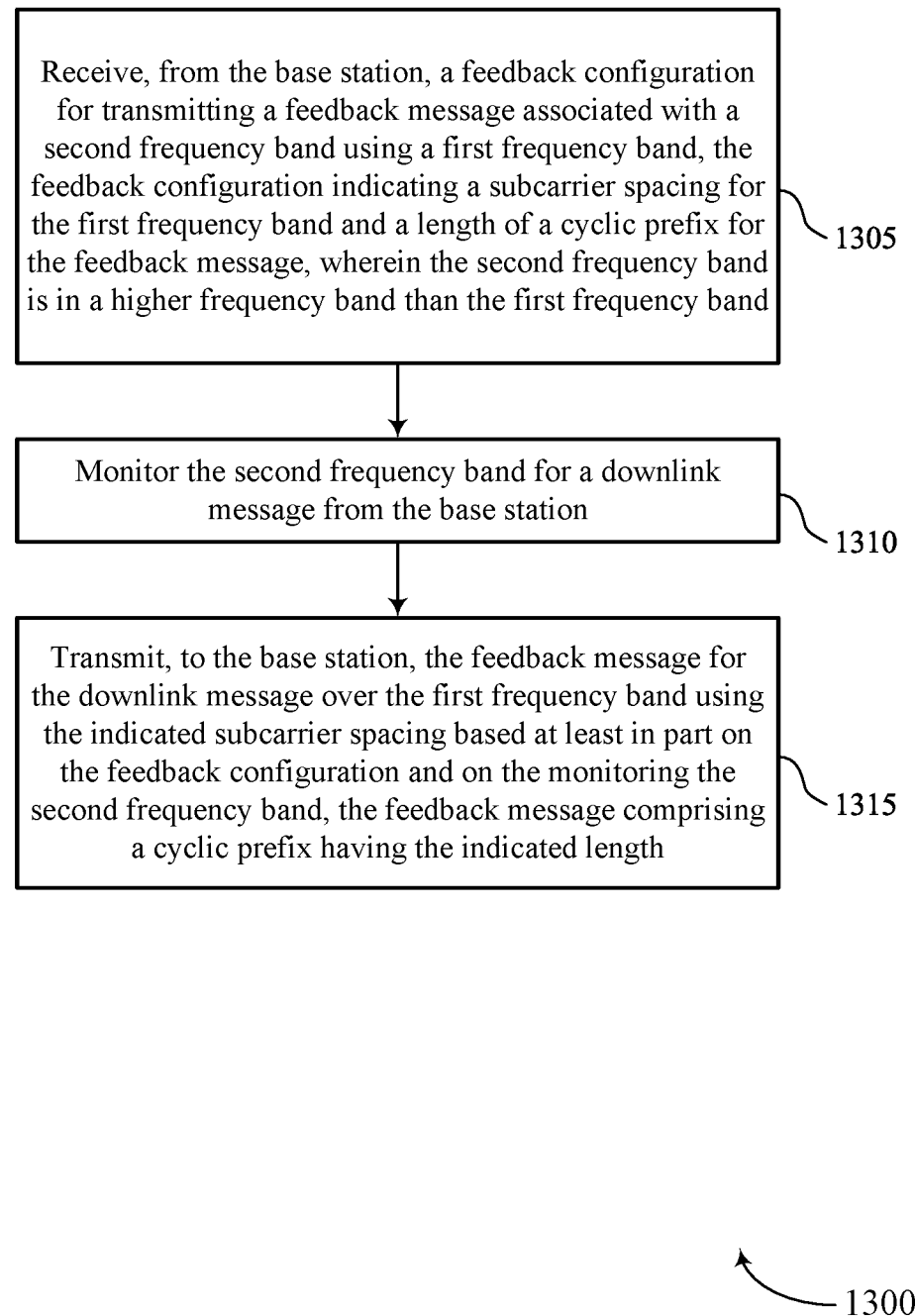
FIGS. 13 through 16 show flowcharts illustrating methods that support fast feedback techniques for high frequency bands in wireless communications systems in accordance with aspects of the present disclosure.

FIG. 13 shows a flowchart illustrating a method 1300 that supports fast feedback techniques for high frequency bands in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The operations of 1305 may be performed in accordance with examples as disclosed herein. In some examples, aspects of the operations of 1305 may be performed by a configuration receiver 725 as described with reference to FIG. 7.

At 1310, the method may include monitoring the second frequency band for a downlink message from the base station. The operations of 1310 may be performed in accordance with examples as disclosed herein. In some examples, aspects of the operations of 1310 may be performed by a monitoring component 730 as described with reference to FIG. 7.

At 1315, the method may include transmitting, to the base station, the feedback message for the downlink message over the first frequency band using the indicated subcarrier spacing based on the feedback configuration and on the monitoring the second frequency band, the feedback message including a CP having the indicated length. The operations of 1315 may be performed in accordance with examples as disclosed herein. In some examples, aspects of the operations of 1315 may be performed by a feedback transmitter 735 as described with reference to FIG. 7.

Figure 14:
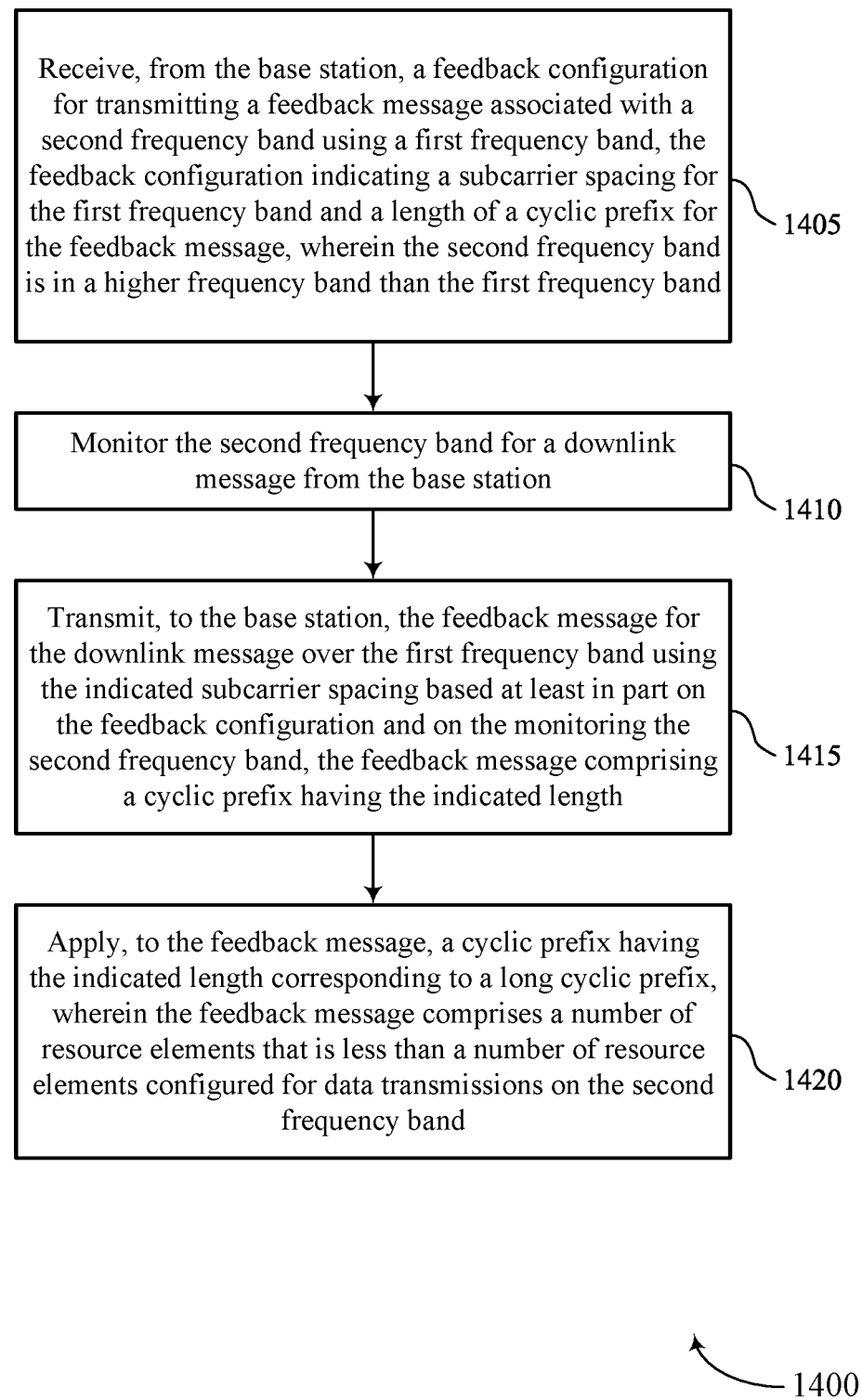

FIG. 14 shows a flowchart illustrating a method 1400 that supports fast feedback techniques for high frequency bands in wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from the base station, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The operations of 1405 may be performed in accordance with examples as disclosed herein. In some examples, aspects of the operations of 1405 may be performed by a configuration receiver 725 as described with reference to FIG. 7.

At 1410, the method may include monitoring the second frequency band for a downlink message from the base station. The operations of 1410 may be performed in accordance with examples as disclosed herein. In some examples, aspects of the operations of 1410 may be performed by a monitoring component 730 as described with reference to FIG. 7.

At 1415, the method may include transmitting, to the base station, the feedback message for the downlink message over the first frequency band using the indicated subcarrier spacing based on the feedback configuration and on the monitoring the second frequency band, the feedback message including a CP having the indicated length. The operations of 1415 may be performed in accordance with examples as disclosed herein. In some examples, aspects of the operations of 1415 may be performed by a feedback transmitter 735 as described with reference to FIG. 7.

At 1420, the method may include applying, to the feedback message, a CP having the indicated length corresponding to a long CP, where the feedback message includes a number of resource elements that is less than a number of resource elements configured for data transmissions on the second frequency band. The operations of 1420 may be performed in accordance with examples as disclosed herein. In some examples, aspects of the operations of 1420 may be performed by a prefix component 740 as described with reference to FIG. 7.

Figure 15:
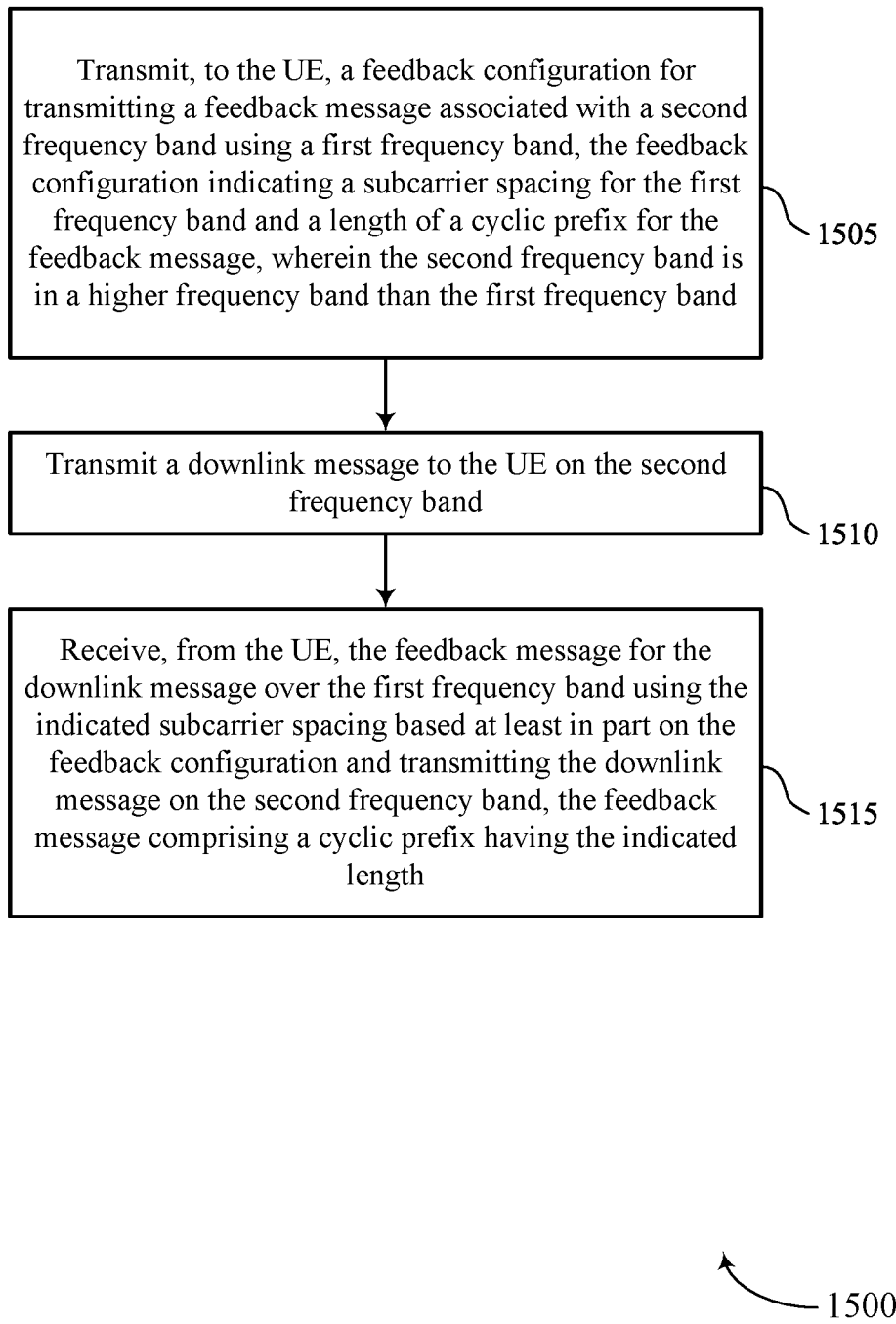

FIG. 15 shows a flowchart illustrating a method 1500 that supports fast feedback techniques for high frequency bands in wireless communications systems in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The operations of 1505 may be performed in accordance with examples as disclosed herein. In some examples, aspects of the operations of 1505 may be performed by a configuration transmitter 1125 as described with reference to FIG. 11.

At 1510, the method may include transmitting a downlink message to the UE on the second frequency band. The operations of 1510 may be performed in accordance with examples as disclosed herein. In some examples, aspects of the operations of 1510 may be performed by a message transmitter 1130 as described with reference to FIG. 11.

At 1515, the method may include receiving, from the UE, the feedback message for the downlink message over the first frequency band using the indicated subcarrier spacing based on the feedback configuration and transmitting the downlink message on the second frequency band, the feedback message including a CP having the indicated length. The operations of 1515 may be performed in accordance with examples as disclosed herein. In some examples, aspects of the operations of 1515 may be performed by a feedback receiver 1135 as described with reference to FIG. 11.

Figure 16:
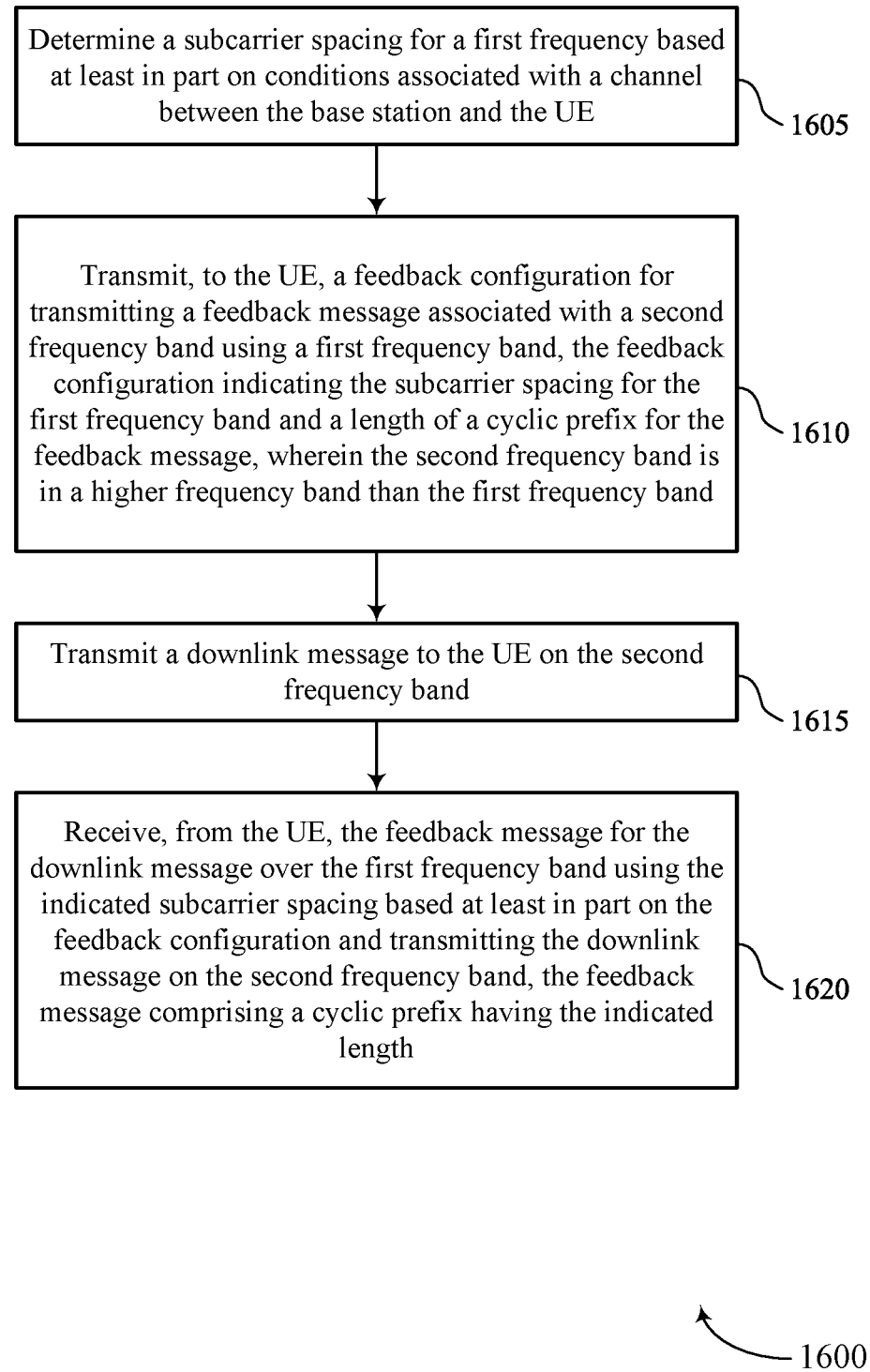

FIG. 16 shows a flowchart illustrating a method 1600 that supports fast feedback techniques for high frequency bands in wireless communications systems in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include determining the subcarrier spacing for the first frequency based on conditions associated with a channel between the base station and the UE. The operations of 1605 may be performed in accordance with examples as disclosed herein. In some examples, aspects of the operations of 1605 may be performed by a conditions component 1140 as described with reference to FIG. 11.

At 1610, the method may include transmitting, to the UE, a feedback configuration for transmitting a feedback message associated with a second frequency band using a first frequency band, the feedback configuration indicating a subcarrier spacing for the first frequency band and a length of a CP for the feedback message, where the second frequency band is in a higher frequency band than the first frequency band. The operations of 1610 may be performed in accordance with examples as disclosed herein. In some examples, aspects of the operations of 1610 may be performed by a configuration transmitter 1125 as described with reference to FIG. 11.

At 1615, the method may include transmitting a downlink message to the UE on the second frequency band. The operations of 1615 may be performed in accordance with examples as disclosed herein. In some examples, aspects of the operations of 1615 may be performed by a message transmitter 1130 as described with reference to FIG. 11.

At 1620, the method may include receiving, from the UE, the feedback message for the downlink message over the first frequency band using the indicated subcarrier spacing based on the feedback configuration and transmitting the downlink message on the second frequency band, the feedback message including a CP having the indicated length. The operations of 1620 may be performed in accordance with examples as disclosed herein. In some examples, aspects of the operations of 1620 may be performed by a feedback receiver 1135 as described with reference to FIG. 11.

The following provides an overview of aspects of the present disclosure:

Aspect 1: A method for wireless communications at a UE, comprising: receiving, from the base station, a feedback configuration for transmitting a feedback message associated with a second frequency band using a first frequency band, the feedback configuration indicating a subcarrier spacing for the first frequency band and a length of a CP for the feedback message, wherein the second frequency band is in a higher frequency band than the first frequency band; monitoring the second frequency band for a downlink message from the base station; and transmitting, to the base station, the feedback message for the downlink message over the first frequency band using the subcarrier spacing based at least in part on the feedback configuration and on the monitoring the second frequency band, the feedback message comprising a CP having the indicated length.

Aspect 2: The method of aspect 1, wherein transmitting the feedback message comprises: applying, to the feedback message, the CP having the indicated length corresponding to a long CP, wherein the feedback message comprises a number of resource elements that is less than a number of resource elements configured for data transmissions on the second frequency band.

Aspect 3: The method of any of aspects 1 through 2, further comprising: transmitting, to the base station, an indication of a capability of the UE to transmit feedback messages associated with the second frequency band on the first frequency band.

Aspect 4: The method of any of aspects 1 through 3, further comprising: generating the feedback message using a FFT and a CP comprising a length that is longer than a buffer length of a buffer associated with an IFFT.

Aspect 5: The method of aspect 4, wherein the length of the of the CP comprises an integer multiple of the buffer length associated with the IFFT.

Aspect 6: The method of any of aspects 1 through 3, further comprising: generating the feedback message using a FFT having a time gap greater than a buffer length of a buffer associated with an IFFT.

Aspect 7: The method of any of aspects 1 through 6, wherein the length of the CP comprises a length that is longer than a default length of a CP associated with the first frequency band.

Aspect 8: The method of any of aspects 1 through 7, wherein the subcarrier spacing for the first frequency band is equal to a subcarrier spacing associated with the second frequency band.

Aspect 9: The method of any of aspects 1 through 7, wherein the subcarrier spacing for the first frequency band comprises an integer multiple of a subcarrier spacing associated with the second frequency band.

Aspect 10: The method of any of aspects 1 through 9, wherein transmitting the feedback message comprises: transmitting the feedback message using a subset of available subcarriers associated with the first frequency band.

Aspect 11: The method of any of aspects 1 through 10, wherein the subcarrier spacing for the first frequency band comprises a subcarrier spacing that is greater than 60 kilohertz; and the first frequency band comprises a sub 6 gigahertz band associated with a fifth generation radio access technology.

Aspect 12: A method for wireless communications at a base station, comprising: transmitting, to the UE, a feedback configuration for transmitting a feedback message associated with a second frequency band using a first frequency band, the feedback configuration indicating a subcarrier spacing for the first frequency band and a length of a CP for the feedback message, wherein the second frequency band is in a higher frequency band than the first frequency band; transmitting a downlink message to the UE on the second frequency band; and receiving, from the UE, the feedback message for the downlink message over the first frequency band using the subcarrier spacing based at least in part on the feedback configuration and transmitting the downlink message on the second frequency band, the feedback message comprising a CP having the indicated length.

Aspect 13: The method of aspect 12, further comprising: determining the subcarrier spacing for the first frequency band based at least in part on conditions associated with a channel between the base station and the UE.

Aspect 14: The method of any of aspects 12 through 13, further comprising: receiving, from the UE, an indication of a capability of the UE to transmit feedback messages associated with the second frequency band on the first frequency band.

Aspect 15: The method of any of aspects 12 through 14, wherein the subcarrier spacing for the first frequency band is equal to a subcarrier spacing associated with the second frequency band.

Aspect 16: The method of any of aspects 12 through 14, wherein the subcarrier spacing for the first frequency band is an integer multiple of a subcarrier spacing associated with the second frequency band.

Aspect 17: The method of any of aspects 12 through 16, further comprising: transmitting, to the UE, control signaling over the first frequency band using the subcarrier spacing based at least in part on the feedback configuration.

Aspect 18: The method of aspect 17, further comprising: detecting a failure condition associated with the second frequency band at the UE, wherein transmitting the control signaling comprises transmitting control signaling indicating the UE to perform a recovery procedure based at least in part on the failure condition.

Aspect 19: The method of any of aspects 12 through 18, wherein receiving the feedback message comprises: receiving the feedback message using a subset of available subcarriers associated with the first frequency band.

Aspect 20: The method of any of aspects 12 through 19, wherein the length of the CP is greater than a length of a CP associated with the second frequency band.

Aspect 21: The method of any of aspects 12 through 20, wherein the subcarrier spacing for the first frequency band comprises a subcarrier spacing that is greater than 60 kilohertz; and the first frequency band comprises a sub 6 gigahertz band associated with a fifth generation radio access technology.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a base station, comprising a processor; memory coupled with the processor; and instructions stored in the memory and executable by the processor to cause the apparatus to perform a method of any of aspects 12 through 21.

Aspect 26: An apparatus for wireless communications at a base station, comprising at least one means for performing a method of any of aspects 12 through 21.

Aspect 27: A non-transitory computer-readable medium storing code for wireless communications at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a feedback configuration for transmitting a feedback message associated with a second frequency band using a first frequency band, the feedback configuration indicating a first subcarrier spacing for the first frequency band and a length of a cyclic prefix for the feedback message, wherein the second frequency band is in a higher frequency band than the first frequency band and the first subcarrier spacing for the first frequency band is based at least in part on a second subcarrier spacing associated with the second frequency band;
   monitoring the second frequency band for a downlink message from a network device; and
   transmitting, based at least in part on the feedback configuration and on monitoring the second frequency band, the feedback message for the downlink message using the first subcarrier spacing for the first frequency band and using a subset of available subcarriers associated with the first frequency band, the feedback message comprising the cyclic prefix having the indicated length.

2. The method of claim 1, wherein transmitting the feedback message comprises:
   applying, to the feedback message, the cyclic prefix having the indicated length corresponding to a long cyclic prefix, wherein the feedback message comprises a first quantity of resource elements that is less than a second quantity of resource elements configured for data transmissions using the second frequency band.

3. The method of claim 1, further comprising:
   transmitting an indication of a capability of the UE to transmit feedback messages associated with the second frequency band using the first frequency band.

4. The method of claim 1, further comprising:
   generating the feedback message using a fast Fourier transform, the cyclic prefix comprising a cyclic prefix length that is longer than a buffer length of a buffer associated with an inverse fast Fourier transform.

5. The method of claim 4, wherein the length of the cyclic prefix comprises an integer multiple of the buffer length associated with the inverse fast Fourier transform.

6. The method of claim 1, further comprising:
   generating the feedback message using a fast Fourier transform having a time gap greater than a buffer length of a buffer associated with an inverse fast Fourier transform.

7. The method of claim 1, wherein the length of the cyclic prefix is longer than a default cyclic prefix length associated with the first frequency band.

8. The method of claim 1, wherein the first subcarrier spacing for the first frequency band is equal to the second subcarrier spacing associated with the second frequency band.

9. The method of claim 1, wherein the first subcarrier spacing for the first frequency band comprises an integer multiple of the second subcarrier spacing associated with the second frequency band.

10. The method of claim 1, wherein:
the first subcarrier spacing for the first frequency band is greater than 60 kilohertz; and
the first frequency band comprises a sub 6 gigahertz band associated with a fifth generation radio access technology.

11. A method for wireless communications at a network device, comprising:
transmitting a feedback configuration for transmitting a feedback message associated with a second frequency band using a first frequency band, the feedback configuration indicating a first subcarrier spacing for the first frequency band and a length of a cyclic prefix for the feedback message, wherein the second frequency band is in a higher frequency band than the first frequency band and the first subcarrier spacing for the first frequency band is based at least in part on a second subcarrier spacing associated with the second frequency band;
transmitting a downlink message using the second frequency band; and
receiving, based at least in part on the feedback configuration and transmitting the downlink message using the second frequency band, the feedback message for the downlink message using the first subcarrier spacing for the first frequency band and using a subset of available subcarriers associated with the first frequency band, the feedback message comprising the cyclic prefix having the indicated length.

12. The method of claim 11, further comprising:
determining the first subcarrier spacing for the first frequency band based at least in part on conditions associated with a channel between the network device and a user equipment (UE).

13. The method of claim 11, further comprising:
receiving an indication of a capability of a user equipment (UE) to transmit feedback messages associated with the second frequency band using the first frequency band.

14. The method of claim 11, wherein the first subcarrier spacing for the first frequency band is equal to the second subcarrier spacing associated with the second frequency band.

15. The method of claim 11, wherein the first subcarrier spacing for the first frequency band is an integer multiple of the second subcarrier spacing associated with the second frequency band.

16. The method of claim 11, further comprising:
transmitting control signaling using the first subcarrier spacing for the first frequency band based at least in part on the feedback configuration.

17. The method of claim 16, further comprising:
detecting a failure condition associated with the second frequency band at a user equipment (UE), wherein the control signaling indicates the UE to perform a recovery procedure based at least in part on the failure condition.

18. The method of claim 11, wherein the length of the cyclic prefix is greater than a cyclic prefix length associated with the second frequency band.

19. The method of claim 11, wherein:
the first subcarrier spacing for the first frequency band is greater than 60 kilohertz; and
the first frequency band comprises a sub 6 gigahertz band associated with a fifth generation radio access technology.

20. An apparatus for wireless communications at a user equipment (UE), comprising:
a processor;
memory in electronic communication with the processor; and
instructions stored in the memory, wherein the instructions are executable by the processor to:
receive a feedback configuration for transmitting a feedback message associated with a second frequency band using a first frequency band, the feedback configuration indicating a first subcarrier spacing for the first frequency band and a length of a cyclic prefix for the feedback message, wherein the second frequency band is in a higher frequency band than the first frequency band and the first subcarrier spacing for the first frequency band is based at least in part on a second subcarrier spacing associated with the second frequency band;
monitor the second frequency band for a downlink message from a network device; and
transmit, based at least in part on the feedback configuration and on monitoring the second frequency band, the feedback message for the downlink message using the first subcarrier spacing for the first frequency band and using a subset of available subcarriers associated with the first frequency band, the feedback message comprising the cyclic prefix having the indicated length.

21. The apparatus of claim 20, wherein the instructions executable by the processor to transmit the feedback message comprise instructions executable by the processor to:
apply, to the feedback message, the cyclic prefix having the indicated length corresponding to a long cyclic prefix, wherein the feedback message comprises a first quantity of resource elements that is less than a second quantity of resource elements configured for data transmissions using the second frequency band.

22. The apparatus of claim 20, wherein the instructions are further executable by the processor to:
transmit an indication of a capability of the UE to transmit feedback messages associated with the second frequency band using the first frequency band.

23. The apparatus of claim 20, wherein the instructions are further executable by the processor to:
generate the feedback message using a fast Fourier transform, the cyclic prefix comprising a cyclic prefix length that is longer than a buffer length of a buffer associated with an inverse fast Fourier transform.

24. The apparatus of claim 20, wherein the instructions are further executable by the processor to:
generate the feedback message using a fast Fourier transform having a time gap greater than a buffer length of a buffer associated with an inverse fast Fourier transform.

25. The apparatus of claim 20, wherein the length of the cyclic prefix is longer than a default cyclic prefix length associated with the first frequency band.

26. The apparatus of claim 20, wherein the first subcarrier spacing for the first frequency band is equal to the second subcarrier spacing associated with the second frequency band.

27. The apparatus of claim 20, wherein the first subcarrier spacing for the first frequency band comprises an integer multiple of the second subcarrier spacing associated with the second frequency band.

28. An apparatus for wireless communications at a network device, comprising:
- a processor;
- memory in electronic communication with the processor; and
- instructions stored in the memory, wherein the instructions are executable by the processor to:
    - transmit a feedback configuration for transmitting a feedback message associated with a second frequency band using a first frequency band, the feedback configuration indicating a first subcarrier spacing for the first frequency band and a length of a cyclic prefix for the feedback message, wherein the second frequency band is in a higher frequency band than the first frequency band and the first subcarrier spacing for the first frequency band is based at least in part on a second subcarrier spacing associated with the second frequency band;
    - transmit a downlink message on the second frequency band; and
    - receive, based at least in part on the feedback configuration and transmitting the downlink message using the second frequency band, the feedback message for the downlink message using the first subcarrier spacing for the first frequency band and using a subset of available subcarriers associated with the first frequency band, the feedback message comprising the cyclic prefix having the indicated length.

\* \* \* \* \*